United States Patent
Hayashi et al.

[11] Patent Number: 6,122,914
[45] Date of Patent: Sep. 26, 2000

[54] SWASH PLATE TYPE CONTINUOUSLY VARIABLE TRANSMISSION

[75] Inventors: Tsutomu Hayashi; Yoshihiro Nakajima; Hideo Okuzaki; Masako Takahashi; Hiroaki Kayama; Kenji Sakakibara, all of Saitama, Japan

[73] Assignee: Honda Giken Kogyo Kabhushiki Kaisha, Tokyo, Japan

[21] Appl. No.: 09/151,289

[22] Filed: Sep. 11, 1998

[30] Foreign Application Priority Data

| Sep. 11, 1997 | [JP] | Japan | 9-246854 |
| Sep. 11, 1997 | [JP] | Japan | 9-246855 |
| Sep. 11, 1997 | [JP] | Japan | 9-246856 |
| Oct. 3, 1997 | [JP] | Japan | 9-270790 |

[51] Int. Cl.[7] .................................................. F16D 39/00
[52] U.S. Cl. .................................. 60/489; 91/480; 91/476
[58] Field of Search ........................... 60/489, 487, 488; 91/474, 476, 478, 479, 480, 503

[56] References Cited

U.S. PATENT DOCUMENTS 5,205,123  4/1993  Dunstan ..................................... 60/487

FOREIGN PATENT DOCUMENTS 62-177353  8/1987  Japan .
63-140164  6/1988  Japan .
63-203959  8/1988  Japan .
B2 6-89828  11/1994  Japan .

*Primary Examiner*—Edward K. Look
*Assistant Examiner*—Thomas E. Lazo
*Attorney, Agent, or Firm*—Birch, Stewart, Kolasch & Birch, LLP

[57] ABSTRACT

It is intended to provide a swash plate type continuously variable transmission capable of automatically affording a lock-up state in which second distributing valves are stopped at their stroke mid-point to cut off motor ports when a motor swash plate stands upright, even without using any special interlocking mechanism. Second distributing valves for bringing motor ports of motor cylinder bores into communication with a high-pressure oil path and a low-pressure oil path selectively in an alternate manner are arranged in parallel with the axis X of a cylinder block; a valve swash plate for reciprocating the second distributing valves is integrally combined with a motor swash plate on the same slant plane; and the motor ports are formed so as to be controlled selectively by the second distributing valves at respective positions 90° out of phase in the circumferential direction of the cylinder block 4 with respect to the corresponding motor cylinder bores, the second distributing valves being stopped at their stroke mid-points when the motor swash plate stands upright. In a swash plate type hydraulic unit for use as a swash plate type oil-hydraulic pump or motor, it is intended to attain the reduction in radial size of the hydraulic unit while ensuring a sufficient plunger stroke.

20 Claims, 11 Drawing Sheets

SWASH PLATE TYPE CONTINUOUSLY VARIABLE TRANSMISSION

BACKGROUND OF THE INVENTION

FIELD OF THE INVENTION

The present invention relates to a hydrostatic continuously variable transmission having a swash plate in which a swash plate type oil-hydraulic pump and a oil-hydraulic motor are connected together through a closed hydraulic circuit, the oil-hydraulic motor is a variable displacement type motor. More particularly, the invention is concerned with an improvement of a swash plate type continuously variable transmission comprising a cylinder block having a large number of pump cylinder bores and motor cylinder bores arranged in parallel and annularly around a cylinder block axis, a large number of pump ports are connected individually to the pump cylinder bores and a large number of motor ports are connected individually to the motor cylinder bores; a large number of pump plungers are slidably fitted respectively in the pump cylinder bores; a large number of motor plungers are slidably fitted respectively in the motor cylinder bores; a pump swash plate is disposed oppositely to one end face of the cylinder block and is adapted to rotate relatively with respect to the one end face of the cylinder block, thereby causing the pump plungers to reciprocate. A motor swash plate is disposed oppositely to an opposite end face of the cylinder block, and is adapted to rotate relatively with respect to the opposite end face of the cylinder block, thereby causing the motor plungers to reciprocate, and is capable of tilting between an upright position orthogonal to the cylinder block axis in which the reciprocating stroke is reduced to zero and a maximum tilted position in which the reciprocating stroke is maximized. An annular high-pressure oil path and an annular low-pressure oil path are provided and surround the cylinder block axis; and a large number of spool type first distributing valves and second distributing valves disposed in the cylinder block are adapted to bring the pump ports and the motor ports into communication with the high-pressure oil path and the low-pressure oil path selectively in an alternate manner through a stroke mid-point at which the pump ports and the motor ports are cut off from both oil paths, the continuously variable transmission includes a lock-up function for cutting off the motor ports to improve the hydraulic transfer efficiency when the motor swash plate is in an upright state.

The present invention relates to a swash plate type hydraulic unit for use as a swash plate type oil-hydraulic pump or motor. Particularly, the invention is concerned with an improvement of a swash plate type hydraulic unit comprising a cylinder block having a large number of cylinder bores arranged annularly on a first pitch circle which surrounds the axis of the cylinder block and in parallel with the said axis, and also having a large number of ports connected individually to the cylinder bores, a large number of plungers are slidably fitted, respectively, in the pump cylinder bores. Plunger swash plates are adapted to engage end portions of the plungers which end portions project to one end side of the cylinder block, the plunger swash plate is adapted to rotate relatively with respect to the cylinder block, thereby causing the plungers to reciprocate. A low-pressure oil path and a high-pressure oil path are provided with a large number of spool type distributing valves disposed in the cylinder block annularly on a second pitch circle which surrounds the cylinder block axis and in parallel with the said axis. The distributing valves are adapted to reciprocate axially to bring the ports of the cylinder bores into communication with the low-pressure oil path and the high-pressure oil path selectively in an alternate manner, and valve swash plates are adapted to engage end portions of the distributing valves which end portions project to one end side of the cylinder block. The valve swash plates are adapted to rotate relatively with respect to the cylinder block, thereby causing the distributing valves to reciprocate.

The present invention relates to a swash plate type-hydraulic unit for use as a swash plate type oil-hydraulic pump or motor. Particularly, the invention is concerned with an improvement of a swash plate type hydraulic unit comprising a cylinder block, the cylinder block having a large number of cylinder bores arranged annularly in parallel with a cylinder block axis on a first pitch circle which surrounds the axis and also includes a large number of ports connected individually to the cylinder bores. A large number of plungers are slidably fitted respectively in the cylinder bores. Plunger swash plates are adapted to rotate relatively with respect to the cylinder block, thereby causing the plungers to reciprocate, a low-pressure oil path and a high-pressure oil path, a large number of spool type distributing valves disposed in the cylinder block annularly in parallel with the cylinder block axis on a second pitch circle which is concentric with the first pitch circle, the distributing valves are adapted to reciprocate axially to bring the ports of the cylinder bores into communication with the low-pressure oil path and the high-pressure oil path selectively in an alternate manner; and valve swash plates are adapted to rotate relatively with respect to the cylinder block, thereby causing the distributing valves to reciprocate.

The present invention relates to a hydrostatic continuously variable transmission, especially to a so-called a swash plate type continuously variable transmission. Particularly, the invention is concerned with an improvement of a swash plate type continuously variable transmission comprising a cylinder block having a large number of pump cylinder bores and motor cylinder bores arranged in parallel with and annularly around a cylinder block axis, a large number of pump ports are connected individually to the pump cylinder bores and a large number of motor ports are connected individually to the motor cylinder bores. A large number of pump plungers are slidably fitted respectively in the pump cylinder bores. A large number of motor plungers are slidably fitted, respectively, in the motor cylinder bores. A pump swash plate is disposed oppositely to one end face of the cylinder block and is adapted to rotate relatively with respect to the one end face of the cylinder block, thereby causing the pump plungers to reciprocate. A motor swash plate is disposed oppositely to an opposite end face of the cylinder block and is adapted to rotate relatively with respect to the opposite end face of the cylinder block, thereby causing the motor plungers to reciprocate. An annular high-pressure oil path and an annular low-pressure oil path are provided and surround the cylinder block axis. A large number of spool type first distributing valves and second distributing valves are disposed in the cylinder block and are adapted to bring the pump ports and the motor ports into communication with the high-pressure oil path and the low-pressure oil path selectively in an alternate manner.

DESCRIPTION OF BACKGROUND ART

A similar hydrostatic continuously variable transmission having a swash plate is disclosed, for example, in Japanese Patent Publication No. Hei 6-89828.

Heretofore, a similar swash plate type hydraulic unit was disclosed in Japanese Patent Laid Open No. Sho 63-203959.

Heretofore, a similar swash plate type continuously variable transmission, has been disclosed wherein (1) one in which a large number of first and second distributing valves are arranged in the radial direction of a cylinder block (see Japanese Patent Laid Open No. Sho 63-140164) and (2) one in which first distributing valves are arranged in parallel with the axis of a cylinder block, while second distributing valves are arranged in the radial direction of the cylinder block (see Japanese Patent Laid Open No. Sho 63-203959).

In the swash plate type continuously variable transmission, a large number of second distributing valves are arranged radially in a cylinder block and an eccentric ring for reciprocating each such second distributing valve with the rotation of a pump cylinder is supported by a transmission case. Further, in order to let the transmission have a lock-up function, the above eccentric ring is interlocked with a motor swash plate so that the amount of eccentricity of the eccentric ring becomes zero in an upright state of the motor swash plate, whereby the second distributing valves are stopped at their stroke midpoints to cut off motor ports.

However, the presence of a mechanism for interlocking the motor swash plate and the eccentric ring which are of different motions not only makes the structure of the continuously variable transmission complicated but also prevents the reduction in size of the transmission.

SUMMARY AND OBJECTS OF THE INVENTION

The present invention has been accomplished in view of the above-mentioned circumstances and it is an object of the invention to provide the foregoing swash plate type continuously variable transmission of a simple structure and a compact size wherein, when the motor swash plate is in its upright state, here automatically is obtained a lock-up state with the second distributing valves stopped at their stroke mid-points to cut off the motor ports, even without the use of any special interlocking mechanism.

For achieving the above-mentioned object, in a swash plate type continuously variable transmission comprising a cylinder block, the cylinder block having a large number of pump cylinder bores and motor cylinder bores are arranged in parallel with and annularly around a cylinder block axis, a large number of pump ports are connected individually to the pump cylinder bores and a large number of motor ports are connected individually to the motor cylinder bores. A large number of pump plungers are slidably fitted respectively in the pump cylinder bores. A large number of motor plungers are slidably fitted respectively in the motor cylinder bores. A pump swash plate is disposed opposedly to one end face of the cylinder block and is adapted to rotate relatively with respect to the one end face of the cylinder block, thereby causing the pump plungers to reciprocate. A motor swash plate is disposed opposedly to an opposite end face of the cylinder block, and is adapted to rotate relatively with respect to the opposite end face of the cylinder block, thereby causing the motor plungers to reciprocate, and is capable of tilting between an upright position orthogonal to the cylinder block axis in which the reciprocating stroke is reduced to zero and a maximum tilted position in which the reciprocating stroke is maximized. An annular high-pressure oil path and an annular low-pressure oil path both surround the cylinder block axis. A large number of spool type first distributing valves and second distributing valves are disposed in the cylinder block and are adapted to bring the pump ports and the motor ports into communication with the high-pressure oil path and the low-pressure oil path selectively in an alternate manner through a stroke-mid point at which the pump ports and the motor ports are cut off from both oil paths. The present invention is characterized in that the second distributing valves for bringing the motor ports into communication with the high-pressure oil path and the low-pressure oil path are selectively disposed in an alternate manner in the cylinder lock in parallel with the cylinder block axis. A valve swash plate is adapted to rotate relatively with respect to the cylinder block to reciprocate the second distributing valves integrally combined with the motor swash plate on the same slant plane. The motor ports of the motor cylinder bores are formed so as to be selectively controlled respectively by the second distributing valves at respective positions 90° out of phase in the circumferential direction of the cylinder block with respect to the motor cylinder bores, and that when the valve swash plate, together with the motor swash plate, assumes an upright position, the second distributing valves are stopped at their stroke midpoints.

According to this feature, even with the valve swash plate combined with the motor swash plate on the same slant plane, the motor ports of the motor cylinder bores are formed so as to be controlled selectively by the second distributing valves at respective positions 90° out of phase in the circumferential direction of the cylinder block with respect to the motor cylinder bores, so upon tilting of the motor swash plate, the valve swash plate which also tilts together with the motor swash plate imparts reciprocating motions to the second distributing valves, whereby the motor ports corresponding to the motor cylinder bores in an expansion stroke are brought into communication accurately with the high-pressure oil path, while the motor ports corresponding to the motor cylinder bores in a contraction stroke are communicated accurately with the low-pressure oil path, thereby making it possible to effect a hydraulic transfer. On the other hand, in an upright state of the motor swash plate, the valve swash plate which has become upright together with the motor swash plate holds the second distributing valves at their stroke, mid-points, whereby there automatically can be obtained a lock-up state in which all the motor ports are cut off from both high- and low-pressure oil paths. Thus, it is not necessary to specially use an interlocking mechanism for obtaining such a lock-up state automatically.

In the above conventional swash plate type hydraulic unit, an increase of the plunger stroke is effective for increasing the capacity of the hydraulic unit while attaining the reduction in its radial size. In the hydraulic unit disclosed in the above unexamined publication, however, since a group of distributing valves are annularly arranged radially outside a group of annularly-arranged plungers, the distributing valve group impedes the reduction in radial size of the hydraulic unit.

The present invention has been accomplished in view of such circumstances and it is an object of the invention to provide the foregoing swash plate type hydraulic unit in which a group of distributing valves are disposed by utilizing a dead space present inside a group of plungers, thereby making it possible to ensure a sufficient plunger stroke and at the same time attain the reduction in radial size effectively.

For achieving the above-mentioned object, in a swash plate type hydraulic unit comprising a cylinder block, the cylinder having a large number of cylinder bores arranged annularly in parallel with a cylinder block axis on a first pitch circle which surrounds the said axis and also includes a large number of ports connected individually to the cylinder bores. A large number of plungers are slidably fitted respectively in the cylinder bores. Plunger swash plates are adapted to engage end portions of the plungers which end portions project to one end side of the cylinder block. The plunger swash plates are adapted to rotate relatively with respect to the cylinder block, thereby causing the plungers to reciprocate. A low-pressure oil path and a high-pressure oil path are provided. A large number of spool type distributing valves are disposed in the cylinder block annularly in parallel with the cylinder block axis on a second pitch circle which surrounds the axis. The distributing valves are adapted to reciprocate axially to bring the ports of the cylinder bores into communication with the low-pressure oil path and the high-pressure oil path selectively in an alternate manner; and valve swash plates are adapted to engage end portions of the distributing valves which end portions project to one end side of the cylinder block, the valve swash plates are adapted to rotate relatively with respect to the cylinder block, thereby causing the distributing valves to reciprocate. The present invention is characterized in that the distributing valves are formed smaller in diameter than the plungers and that the second pitch circle is set smaller in diameter than the first pitch circle.

According to this first feature, the distributing valve group is disposed in the dead space present radially inside the plunger group, therefore, even if the first pitch circle is set sufficiently large to ensure a sufficiently large stroke to be imparted to each plunger from the plunger swash plate, the presence of the distributing valve group does not increase the diameter of the cylinder block and it is possible to attain the reduction in radial size of the hydraulic unit. Besides, since the distributing valves are formed smaller in diameter than the plungers, the distributing valve group can be disposed easily even inside the plunger group.

In addition to the above feature, the present invention is also characterized in that each valve swash plate is disposed on the same slant plane as the associated plunger swash plate and is formed integrally with the plunger swash plate.

According to this feature, not only is it possible to suppress the increase in axial size of the hydraulic unit caused by the use of plural swash plates but also both plunger swash plate and valve swash plate can be made integral with each other easily.

In addition to the above feature, the present invention is also characterized in that ports of the cylinder bores are formed so as to be controlled selectively by the distributing valves at respective positions 90° out of phase in the circumferential direction of the cylinder block with respect to the cylinder bores.

According to this third feature, the distributing valves, at mid-points of their reciprocating strokes, cut off the ports from both low and high-pressure oil paths, and even if each plunger swash plate and the associated valve swash plate are disposed to be inclined in the same direction, when a plunger reaches its advance or retreat motion limit, the corresponding port is cut off from both low and high-pressure oil paths. Therefore, when the plunger subsequently changes its motion to retreat or advance motion, the above port can be accurately switched over its communication to the low or high-pressure oil path.

In the above conventional swash plate type hydraulic unit, since plunger swash plates and valve swash plates are arranged mutually 90° out of phase about a cylinder block axis, it is fairly troublesome to effect machining of those swash plates and hence the mass-productivity thereof is low. Further, although plungers and distributing valves are provided with return springs for engagement thereof with the plunger swash plates and the valves swash plates, it is likely, due to the characteristics of the return springs, that there will occur a follow-up delay of the plungers and distributing valves relative to the those swash plates in a high-speed operation.

The present invention has been accomplished in view of such circumstances and it is an object of the invention to provide the foregoing swash plate type hydraulic unit in which the machining of plunger swash plates and valve swash plates is easy, thus ensuring a high mass-productivity, and in which plungers and distributing valves can follow those swash plates accurately even in a high-speed operation.

For achieving the above-mentioned object, a swash plate type hydraulic unit includes a cylinder block having a large number of cylinder bores arranged annularly in parallel with a cylinder block axis on a first pitch circle which surrounds the axis and also having a large number of ports connected individually to the cylinder bores. A large number of plungers are slidably fitted respectively in the cylinder bores. Plunger swash plates are adapted to rotate relatively with respect to the cylinder block, thereby causing the plungers to reciprocate. A low-pressure oil path and a high-pressure oil path are provided. A large number of spool type distributing valves are disposed in the cylinder block annularly in parallel with the cylinder block axis on a second pitch circle which is concentric with the first pitch circle, the distributing valves are adapted to reciprocate axially to bring the ports of the cylinder bores into communication with the low-pressure oil path and the high-pressure oil path selectively in an alternate manner. Valve wash plates are adapted to rotate relatively with respect to the cylinder block, thereby causing the distributing valves to reciprocate, the present invention is characterized in that each plunger swash plate and the associated valve swash plate are disposed on the same slant plane and are formed integrally with each other to constitute a swash plate assembly, and that common retainer plates for retaining the plungers and the distributing valves in engagement with the plunger swash plates and the valve swash plates are attached to the swash plate assemblies respectively.

According to this feature, since each plunger swash plate and the associated valve swash plate are arranged on the same slant plane, they can be formed at a time into a swash plate assembly. Moreover, since the plungers and distributing valves are always held at respective positions of engagement with the plunger swash plates and the valve swash plates by means of retainer plates attached to the swash plate assemblies, it is possible to let the plungers and distributing valves follow the plunger swash plates and the valve swash plates forcibly even in a high-speed operation, thus ensuring accurate reciprocating motions. Additionally, there is attained a simple structure because a single common retainer plate is used for each plunger and distributing valve group.

In addition to the above feature, the present invention is characterized in that the plungers and the distributing valves are formed with spherical ends through neck portions, the spherical ends being in engagement with the plunger swash plates and the valve swash plates, and that the retainer plates have first and second retaining holes in which are respectively fitted neck portions of the plungers and the distributing valves, the first and second retaining holes being smaller in diameter than the spherical ends, and also have first and second cutouts through which the retaining holes are opened to the peripheral edges of the retainer plates to permit the passage therethrough of the neck portions.

Further, in connection with the above feature, the present invention is characterized in that at least one of the first and second cutouts, instead of being opened to the peripheral edges of the retainer plates, are opened to insertion holes formed in the retainer plates, the said insertion holes being larger in diameter than the corresponding spherical ends.

According to another feature, the neck portions of the plungers and distributing valves are passed through the first and second cutouts of the retainer plates and are fitted in the first and second retaining holes, then the plungers and the distributing valves are mounted to the cylinder block, and the retainer-plates are attached to the swash plate assemblies. By such simple operations, the fitted state of corresponding neck portions and retaining holes can be maintained. Thus, it is not necessary to use any special stopper for preventing each neck portion from coming off the associated retaining hole. That is, it is possible to make contribution to a further structural simplification.

In addition to the above features, the present invention is characterized in that the retainer plates are attached to cylindrical portions of the swash plate assemblies through cir-clips.

According to this feature, each retainer plate can be attached to the associated swash plate assembly easily with use of such a simple component such as a cir-clip.

Further, in addition to the above features, the present invention is characterized in that the ports of the cylinder bores are formed so as to be controlled selectively by the distributing valves at respective positions 90° out of phase in the circumferential direction of the cylinder block with respect to the cylinder bores.

According to this feature, the distributing valves, at mid-points of their reciprocating strokes, cut off the ports from both low- and high-pressure oil paths, and even if the plunger swash plates and the valve swash plates are disposed inclinedly in the same direction, when a plunger reaches its advance or retreat motion limit, the corresponding port is cut off from both low- and high-pressure oil paths. Therefore, when the plunger subsequently changes its motion to retreat or advance motion, the above port can be accurately switched over its communication to the low- or high-pressure oil path.

In the above conventional transmission (1), since the first and second distributing valves are arranged radially, first and second valve holes for insertion therein of the first and second distributing valves cannot be quickly machined with a parallel multi-spindle tool. In the above conventional transmission (2), since the first and second distributing valves are arranged at right angles to each other, it is impossible to machine both first and second valve holes simultaneously. Thus, both such conventional transmissions encounter a difficulty with regard to mass productivity. Further, in the conventional transmission (1) it is necessary that first and second eccentric rings for actuating the first and second distributing valves be disposed on the outer periphery of the cylinder block, and also in the conventional transmission (2) it is necessary that an eccentric ring for actuating the first distributing valves be disposed on the outer periphery of the cylinder block. Consequently, an increase in the radial size of each transmission is unavoidable and it is difficult to attain the reduction of size in that direction.

The present invention has been accomplished in view of such circumstances and it is an object of the invention to provide a swash plate type continuously variable transmission wherein, like pump cylinder holes and motor cylinder holes, first and second valve holes with first and second distributing valves fitted therein are arranged in parallel with the axis of a cylinder block so that they can be machined easily and quickly with use of a parallel multi-spindle tool and which can be constituted compactly in the radial direction.

For achieving the above-mentioned object, in a swash plate type continuously variable transmission comprising a cylinder block, the cylinder block having a large number of pump cylinder bores and motor cylinder bores are arranged in parallel with and annularly around a cylinder block axis, a large number of pump ports are connected individually to the pump cylinder bores and a large number of motor ports are connected individually to the motor cylinder bores. A large number of pump plungers are slidably fitted, respectively, in the pump cylinder bores. A large number of motor plungers are slidably fitted respectively in the motor cylinder bores. A pump swash plate is disposed oppositely to one end face of the cylinder block and is adapted to rotate relatively with respect to the one end face of the cylinder block, thereby causing the pump plungers to reciprocate. A motor swash plate is disposed oppositely to an opposite end face of the cylinder block and is adapted to rotate relatively with respect to the opposite end face of the cylinder block, thereby causing the motor plungers to reciprocate. An annular high-pressure oil path and an annular low-pressure oil path both surrounding the cylinder block axis; and a large number of spool type first distributing valves and second distributing valves are disposed in the cylinder block and are adapted to bring the pump ports and the motor ports into communication with the high-pressure oil path and the low-pressure oil path selectively in an alternate manner. The present invention is characterized in that the annular high-pressure oil path and low-pressure oil path are formed side by side in the axial direction of the cylinder block, that the first distributing valves and the second distributing valves are slidably fitted respectively in a large number of first valve holes and second valve holes, the first and second valve holes are formed in the cylinder block so as to extend in parallel with the cylinder block axis while intersecting both said oil paths, and that a first valve swash plate and a second valve swash plate are disposed respectively adjacent the pump swash plate and the motor swash plate and both are adapted to rotate relatively with respect to the cylinder block, thereby causing the first and second distributing valves to reciprocate.

According to the above first feature, since the pump cylinder bores, motor cylinder bores, first valve holes and second valve holes are all arranged in parallel with the cylinder block axis, they can be machined in the cylinder block easily and quickly by means of a multi-spindle drilling machine, and thus their mass productivity is high. Besides, the supply and reception of oil pressure between the pump cylinder bores and the motor cylinder bores can surely be done by reciprocating motions of the first and second distributing valves parallel to the cylinder block axis. Further, since the first and second swash valve plates which actuate the first and second distributing valves, respectively, are disposed on both-end sides of the cylinder block like the pump swash plate and the motor swash plate, it is possible to greatly reduce the radial size of the continuously variable transmission.

In addition to the above feature, the present invention is further characterized in that the annular high-pressure oil path and the annular low-pressure oil path are disposed radially inside the group of the pump cylinder bores and the group of the motor cylinder bores.

According to the above feature, the overall length of the annular high-pressure oil path and that of the annular low-pressure oil path can be made as short as possible and hence it is possible to attain a reduction in the volume of both oil paths, diminish the absolute quantity of air bubbles present in the hydraulic oil in the oil paths and thereby improve the hydraulic transfer efficiency.

In addition to the above feature, the present invention is characterized in that the pump plungers and the motor plungers are arranged alternately on a first pitch circle which surrounds the cylinder block axis, and the first distributing valves and the second distributing valves, which are formed smaller in diameter than the pump plungers and the motor plungers, are arranged alternately on a second pitch circle smaller in diameter than and concentric with the first pitch circle.

According to this additional feature, the first and second distributing valve group is disposed radially inside the pump plunger and motor plunger group in the cylinder block. Therefore, even if the first pitch circle is set at a sufficiently large size to ensure sufficient reciprocating strokes which are given to the pump plungers and the motor plungers by the pump swash plate and the motor swash plate, respectively, it is possible to make the continuously variable transmission more compact in its radial direction without an increase in diameter of the cylinder block even in the presence of the distributing valves. Besides, since the first and second distributing valves are formed smaller in diameter than the pump plungers and motor plungers, they can be disposed easily even inside the plunger groups. Further, since the pump plungers and the motor plungers, as well as the first and second distributing valves, are arranged alternately in the circumferential direction of the cylinder block, it is possible to shorten the axial size of the cylinder block and attain the reduction in size even in the axial direction of the continuously variable transmission.

In addition to the above features, the present invention is characterized in that the first valve swash plate is disposed on the same slant plane as the pump swash plate and is formed integrally with the pump swash plate, while the second valve swash plate is disposed on the same slant plane as the motor swash plate and is formed integrally with the motor swash plate.

According to the additional features, not only the pump swash plate and the first valve swash plate can be easily rendered integral with each other and so can be made both motor swash plate and the second valve swash plate, but also it is possible to attain a further reduction in size axially of the continuously variable transmission.

In addition to the above features, the present invention is characterized in that the pump port of each pump cylinder bore is formed so as to be selectively controlled by the first distributing valve at a position 90° out of phase in the circumferential direction of the cylinder block with respect to the pump cylinder bore, while the motor port of each motor cylinder bore is formed so as to be selectively controlled by the second distributing valve at a position 90° out of phase in the circumferential direction of the cylinder block with respect to the motor cylinder bore.

According to the further features, each distributing valve causes the corresponding pump port and motor port to be cut off from both low-and high-pressure oil paths at a mid-point of its reciprocating stroke, and when each plunger arrives at its advance limit or retreat limit, even with the pump swash plate and the first valve swash plate, as well as the motor swash plate and the second valve swash plate, being tilted in the same direction, the corresponding pump port and motor port are cut off from both low- and high-pressure oil paths. Therefore, when each plunger then changes its motion into retreat or advance motion, it is possible to switch over each such port to the low-pressure oil path or the high-pressure oil path accurately.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The mode for carrying out the present invention will be described hereinunder by way of an embodiment thereof illustrated in the accompanying drawings.

Figure 1:
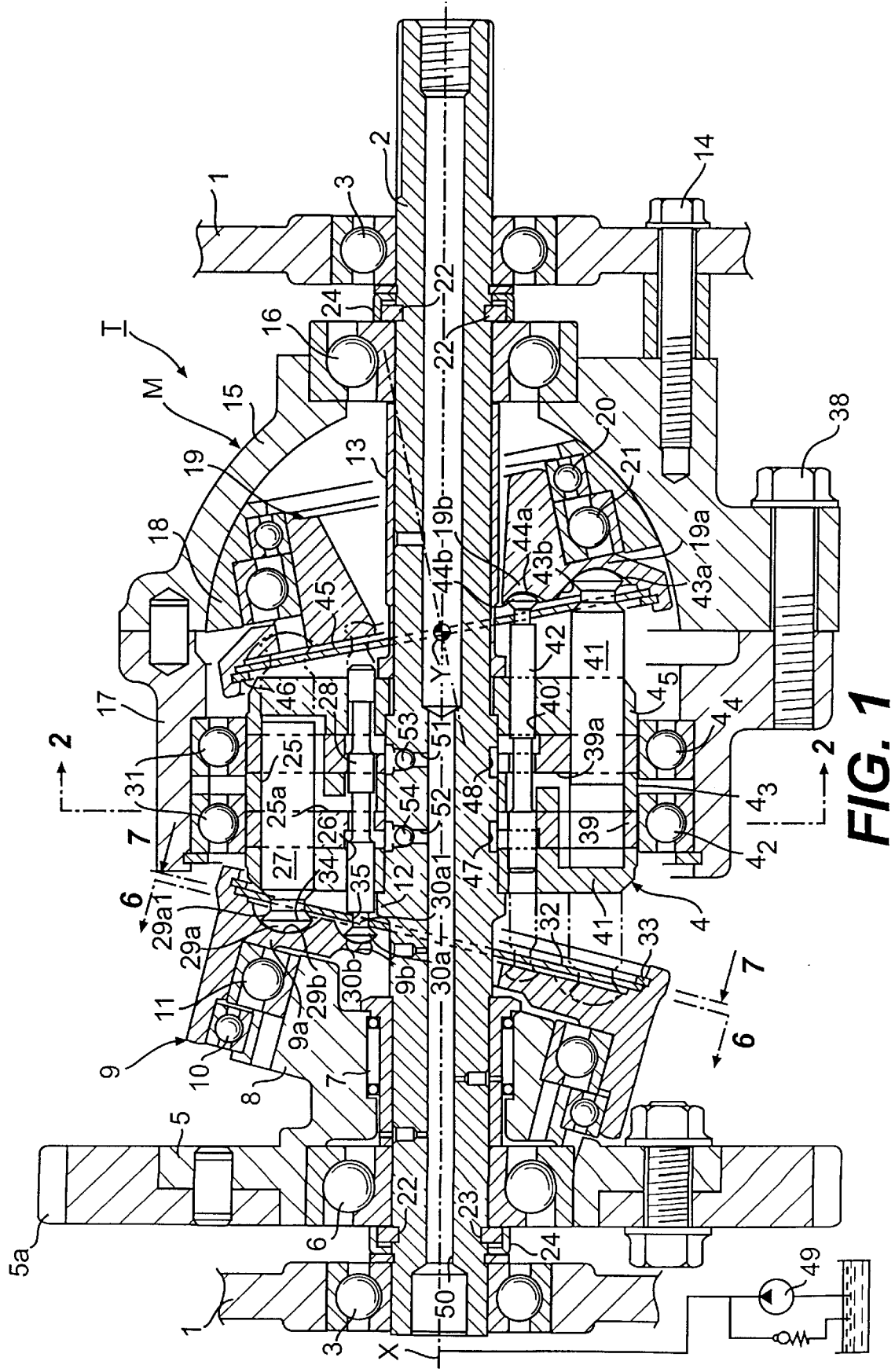
FIG. 1 is a side view in longitudinal section of a continuously variable transmission according to the first embodiment of the present invention.
Figure 2:
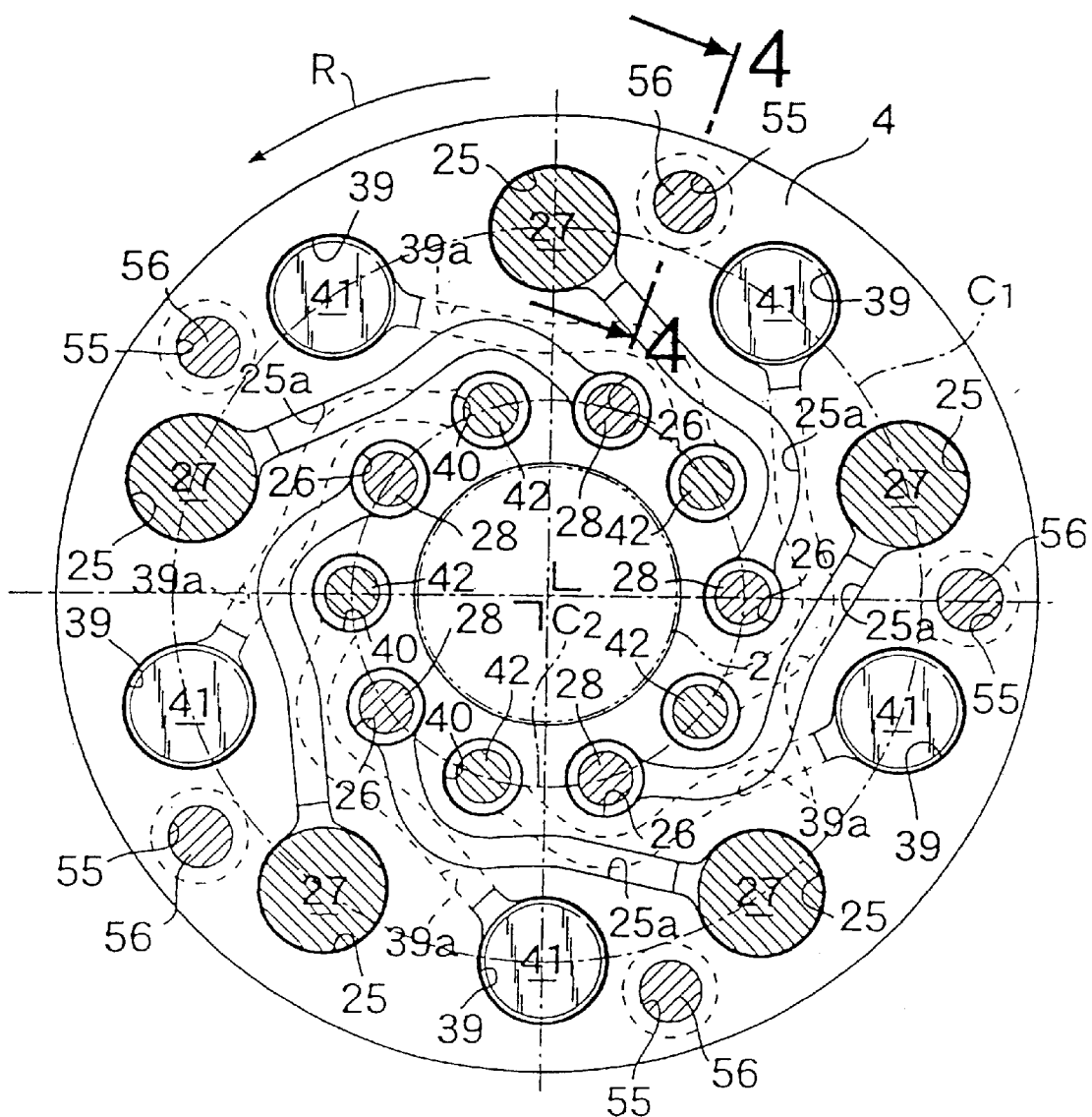
FIG. 2 is a sectional view taken on line 2—2 in FIG. 1.

In FIGS. 1 and 2, an output shaft 2 is supported through ball bearings 3, 3 in both right and left end walls of a transmission case 1 which accommodates the swash plate type continuously variable transmission, indicated at T. An input member 5 with an input gear 5a fixed thereto is supported on the output shaft 2 at a position adjacent to the left-end wall of the transmission case 1 rotatably through an angular contact bearing 6. The power of an engine (not shown) is inputted to the input gear 5a and is outputted from the right end portion of the output shaft 2 to a load (not shown), say, a drive unit in a two-wheeled motor vehicle.

Integral with the input member 5 is a swash plate holder 8 which is supported on the output shaft 2 through a needle bearing 7, and a first swash plate assembly 9 is held by the swash plate holder 8 rotatably through a ball bearing 10 and an angular contact bearing 11. The first swash assembly 9 is integrally provided with a pump swash plate 9a and a first valve swash plate 9b which is enclosed with the pump swash plate 9a and which is disposed on the same slant plane as the pump swash plate. The swash plate holder 8 is disposed so as to cause the pump swash plate 9a and the first valve swash plate 9b to be inclined at a predetermined angle with respect to an axis X of the output shaft 2.

A cylinder block 4 concentric with the output shaft 2 is splined to an intermediate portion of the output shaft and is fixed axially immovably by both flange 12 and sleeve 13 on the output shaft.

On the side opposite to the first swash plate assembly 9 with respect to the cylinder block 4, a swash plate anchor 15, which is fixed to the transmission case 1 with bolt 14, is supported on the output shaft 2 through an angular contact bearing 16. A semicylindrical trunnion 18 having an axis Y orthogonal to the axis X of the output shaft 2 is supported by the swash plate anchor 15 so as to be rotatable in a predetermined angular range. Centrally of the trunnion 18 is supported a second swash plate assembly 19 rotatably through a ball bearing 20 and an angular contact bearing 21. The second swash plate assembly 19 is integrally provided with a motor swash plate 19a and a second valve swash plate 19b which is enclosed with the motor swash plate 19a and which is disposed on the same slant plane as the motor swash plate 19a. The trunnion 18 is provided with an actuating arm (not shown) at one axial end thereof The trunnion 18 is rotated by the said actuating arm, whereby the tilting angle of the motor swash plate 19a and that of the second valve swash plate 19b relative to the axis X of the output shaft 2 can be changed. A cylinder holder 17, which holds the cylinder block 4 rotatably through ball bearings 31, is fixed to the swash plate anchor 15 with bolt 38.

Thus, the left-hand angular contact bearing 6 mounted on the output shaft 2 supports the input member 5 and the first swash plate assembly 9, and the right-hand angular contact bearing 16 mounted on the output shaft 2 supports the swash plate anchor 15. Bisplit cotters 23, 23 engaged with a pair of annular grooves 22, 22 formed on the output shaft 2 are in abutment with the outer side faces of the left and right angular contact bearings 6, 16, respectively, with a retainer ring 24 being fitted on the outer periphery of each cotter 23. Upon operation of the continuously variable transmission T, a thrust load developed between the first swash plate assembly 9 and the cylinder block 4 is borne by the output shaft 2 through the left and right angular contact bearings 6, 16 and then through the left and right cotters 23, 23, while a thrust load generated between the swash plate anchor 15 and the cylinder block 4 is borne by the output shaft 2 through the flange 12 and the right-hand cotter 23,.whereby the load on the transmission case 1 can be diminished.

In the cylinder block 4, a large odd-number (five in the illustrated embodiment) of pump cylinder bores 25 are formed in an annularly arranged state on a first pitch circle C1 (see FIG. 2) which is concentric with the cylinder block 4. Further, first valve holes 26 are formed in the same number as the pump cylinder holes 25 and in an annularly arranged state on a second pitch circle C2 which is smaller in diameter than and concentric with the first pitch circle C1. One end of the pump cylinder bores 25 is open to the left end face of the cylinder block 4, while the opposite end thereof is closed. The first valve holes 26 are formed smaller in diameter than the pump cylinder bores 25 and extend axially through the cylinder block 4.

Pump plungers 27 and spool type first distributing valves 28 are slidably fitted in the pump cylinder bores 25 and the first valve holes 26, respectively. Front ends of the pump plungers 27 and the first distributing valves 28 are projected from the left end face of the cylinder block 4 into abutment with the pump swash plate 9a and the first valve swash plate 9b, respectively. While the input member 5 rotates, the pump swash plate 9a and the first valve swash plate 9b impart axial reciprocating motions to the pump plungers 27 and the first distributing valves 28, respectively, and a swash plate type oil-hydraulic pump P is constituted by them.

Figure 6:
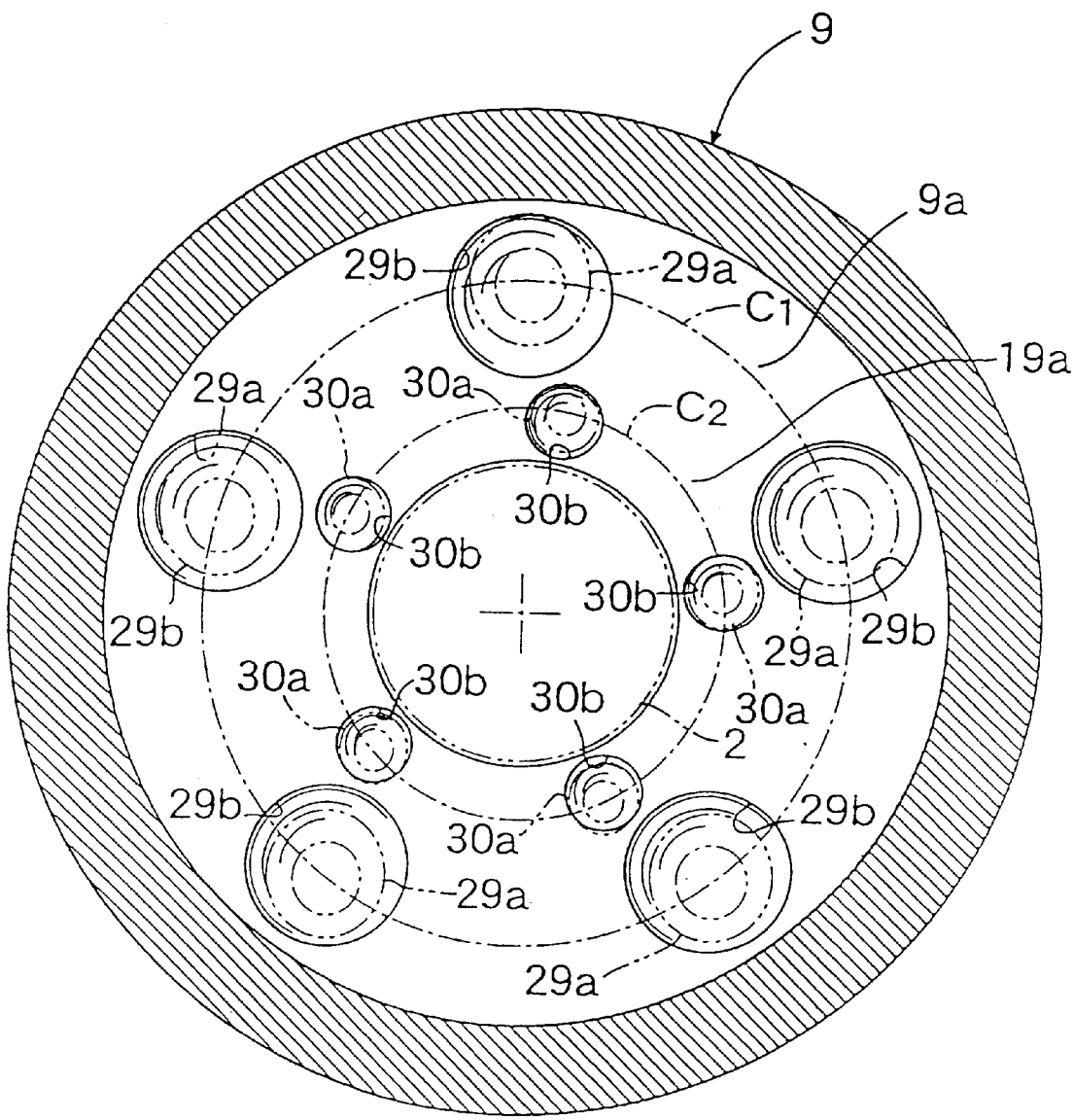
FIG. 6 is a sectional view taken on line 5—5 in FIG. 1.

As shown in FIGS. 1 and 6, the front ends of the pump plungers 27 and the first distributing valves 28 are formed as spherical ends 29a and 30a, respectively, and spherical recesses 29b and 30b for engagement with the spherical ends 29a and 30a are formed in the pump swash plates 9a and the first valve swash plate 9b, respectively, the spherical recesses 29b and 30b being larger in diameter than the spherical ends 29a and 30a, respectively. According to this construction, not only the slippage in the rotational direction between the pump swash plate 9a and the pump plungers 27 and that between the first valve swash plate 9b and the first distributing valve 28 are prevented, but also bending moments exerted on the pump plungers 27 and the first distributing valves 28 from the respective associated swash plates 9a and 9b can be diminished.

Figure 7:
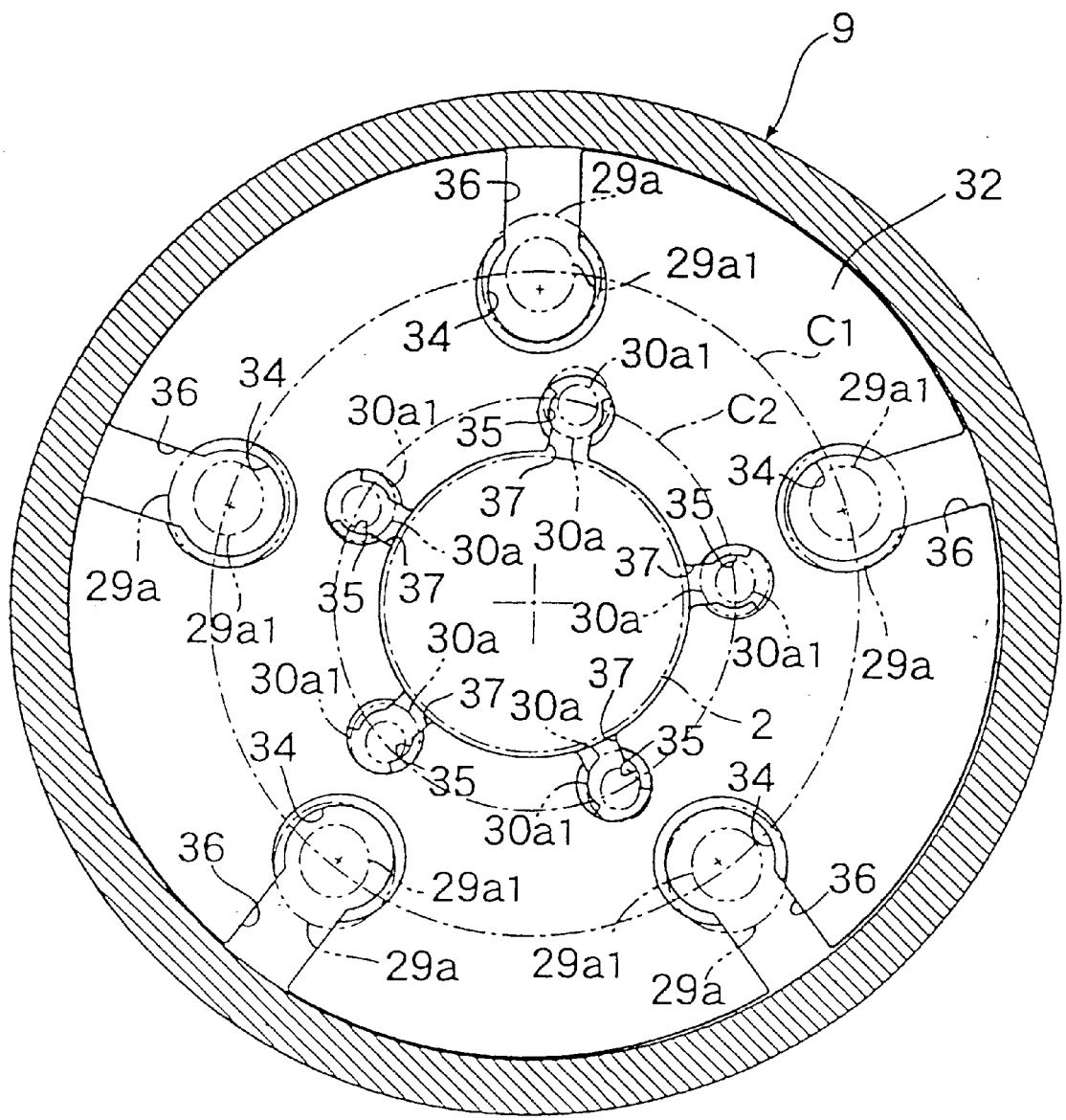
FIG. 7 is a sectional view taken on line 6—6 in FIG. 1.

As shown in FIGS. 1 and 7, an annular retainer plate 32 for holding the spherical ends 29a and 30a of the pump plungers 27 and the first distributing valves 28 in an engaged state with the corresponding spherical recesses 29b and 30b of the swash plates 9a and 9b is attached to the first swash plate assembly 9 rotatably with a cir-clip 33. More specifically, the first swash plate assembly 9 is formed with a cylindrical portion 9c contiguous to the outer peripheral portions of the swash plates 9a and 9b, and the cir-clip 33 is brought into engagement with the inner peripheral surface of the cylindrical portion 9c to retain the retainer plate 32 fitted in the said inner peripheral surface.

In the retainer plate 32 are formed plunger retaining holes 34 corresponding to and in the same number as the annularly arranged pump plungers 27 and valve retaining holes 35 corresponding to and in the same number as the annularly arranged first distributing valves 28. The plunger retaining holes 34 are each formed smaller in diameter than the spherical end $29a_1$ of each pump plunger 27 and larger in diameter than a neck portion $29a_1$ of the spherical end 29a, and are each opened to the outer periphery of the retainer plate 32 through a cutout 36. The width of the cutout 36 is a little larger than the neck portion $29a_1$. After the neck portions $29a_1$ of the pump plungers 27 have been fitted in the plunger retaining holes 34 through the cutouts 36, the pump plungers 27 are inserted respectively into the pump cylinder bores 25 and the retainer plate 32 is attached to the first swash plate assembly 9, whereby not only the neck portions $29a_1$ can be prevented from coming off the cutouts 36, but also the spherical ends 29a can be held in their engaged positions with the spherical recesses 29b by the plunger retaining holes 34. Thus, with the relative rotation of the pump swash plate 9a and the cylinder block 4, the pump plungers 27 can be reciprocated forcibly, so it is not necessary to use a return spring for urging the pump plungers 27 in their projecting direction.

The valve retaining holes 35 are each formed smaller in diameter than the spherical end 30a of each first distributing valve 28 and larger in diameter than a neck portion $30a_1$ of the spherical end 30a, and are each opened to the inner periphery of the retainer plate 32 through a cutout 37. The width of the cutout 37 is a little larger than the neck portion 30$a_1$ of the spherical end 30$a$. Therefore, by the same assembling method as is the case with the pump plungers 27, the neck portions 30 can be prevented from coming off the cutouts 37 and the spherical ends 30$a$ can be held in their engaged positions with the spherical recesses 30$b$, so that the first reciprocating valves 28 can be reciprocated forcibly with the relative rotation of the first valve swash plate 9$b$ and the cylinder block 4.

After the neck portions 29$a_1$ and 30$a_1$, of the pump plungers 27 and first distributing valves 28 have been brought into engagement with the plunger retaining holes 34 and the valve retaining holes 35, respectively, in the retainer plate 32 through the cutouts 36 and 37, the pump plungers 27 and the first distributing valves 28 are inserted into the pump cylinder holes 25 and the first valve holes 26, respectively, and then the retainer plate 32 is attached to the first swash plate assembly 9. Alternatively, first the retainer plate 32 with the pump plungers 27 and the first distributing valves 28 held therein is attached to the first swash plate assembly 9 and then the pump plungers 27 and the first distributing valves 28 are inserted into the pump cylinder bores 25 and the first valve holes 34, respectively. As a result, not only the neck portions 29$a$1 and 30$a_1$ can be prevented from coming off the cutouts 36 and 37, but also the spherical ends 29$a$ and 30$a$ can be held at the respective positions of engagement with the spherical recesses 29$b$ and 30$b$ by means of the plunger retaining holes 34 and the valve retaining holes 35. Thus, with the relative rotation between the pump swash plate 9$a$ and the cylinder block 4, the pump plungers 27 and the first distributing valves 28 can be reciprocated forcibly. In other words, it is not necessary to use return springs for urging the pump plungers 27 and the first distributing valves 28 each in one direction. Moreover, since it is not necessary to use any special swivel stop member for the retainer plate 32 against the first swash plate assembly 9, the mounting of the retainer plate 32 permits the use of the cir-clip 33 which is simple in structure.

Referring again to FIGS. 1 and 2, in the cylinder block 4, motor cylinder bores 39 are formed in the same number as the pump cylinder bores 25 and annularly and alternately with the pump cylinder bores 25 on the first pitch circle C1 of the group of the pump cylinder bores. Likewise, second valve holes 40 are formed in the same number as the motor cylinder bores 39 and annularly and alternately with the first distributing valves 28 on the second pitch circle C2 of the group of the first valve holes 26. One end of the motor cylinder bores 39 is open to the right end face of the cylinder block 4, while the opposite ends thereof are closed. The second valve holes 40 are formed smaller in diameter than the motor cylinder bores 39 and extend axially through the cylinder block 4. In the illustrated embodiment, the pump cylinder bores 25 and the motor cylinder bores 39 are of the same diameter and so are the first and second valve holes 26, 40. Thus, the second valve holes 40 are smaller in diameter than the motor cylinder bores 39. Motor plungers 41 and spool type second distributing valves 42 are slidably fitted in the motor cylinder bores 39 and the second valve holes 40, respectively. Front ends of the motor plungers 41 and the second distributing valves 42 are projected from the right end face of the cylinder block 4 into abutment with the motor swash plate 19$a$ and the second valve swash plate 19$b$, respectively. While the cylinder block 4 rotates, the motor swash plate 19$a$ and the second valve swash plate 19$b$ impart axial reciprocating motions to the motor plunger 41 and the second distributing valves 42, respectively, and an oil-hydraulic motor M is constituted by them.

The front ends of the motor plungers 41 and the second distributing valves 42 are formed as spherical ends 43$a$ and 44$a$, respectively, and spherical recesses 43$b$ and 44$b$ for engagement with and larger in diameter than the spherical ends 43$a$ and 44$a$ are formed in the motor swash plate 19$a$ and the second valve swash plate 19$b$, respectively, whereby not only the slippage between the motor swash plate 19$a$ and the motor plungers 41 and that between the second valve swash plate 19$b$ and the second distributing valves 42 are prevented, but also bending moments exerted on the motor plungers 41 and the second distributing valves 42 from the respective associated swash plates 19$a$ and 19$b$ can be diminished.

An annular retainer plate 45 for holding the spherical ends 43$a$ and 44$a$ of the motor plungers 41 and second distributing valves 42 in an engaged state with the corresponding spherical recesses 43$b$ and 44$b$ of the swash plates 19$a$ and 19$b$ is attached to the second swash plate assembly 19 rotatably with a cir-clip 46. The structure of connection of the retainer plate 45 with the motor plungers 41 and the second distributing valves 42 is the same as the structure of connection of the retainer plate 32 with the pump plunger 27 and the first distributing valve 28. In the cylinder block 4, annular high-pressure oil path 47 and low-pressure oil path 48, which intersect both first and second valve holes 26, 40, are formed in an axially spaced manner. Further formed in the cylinder block 4 are a large number of pump ports 25$a$ extending respectively from the pump cylinder bores 25 and reaching the first valve holes 26 located at positions 90° out of phase in the direction opposite to the rotational direction of the cylinder block 4 (the arrow R in FIG. 2 indicates the rotational direction of the cylinder block), as well as a large number of motor ports 39$a$ extending respectively from the motor cylinder bores 39 and reaching the second valve holes 40 located 90° out of phase in the direction opposite to the rotational direction of the cylinder block 4.

Figure 9:
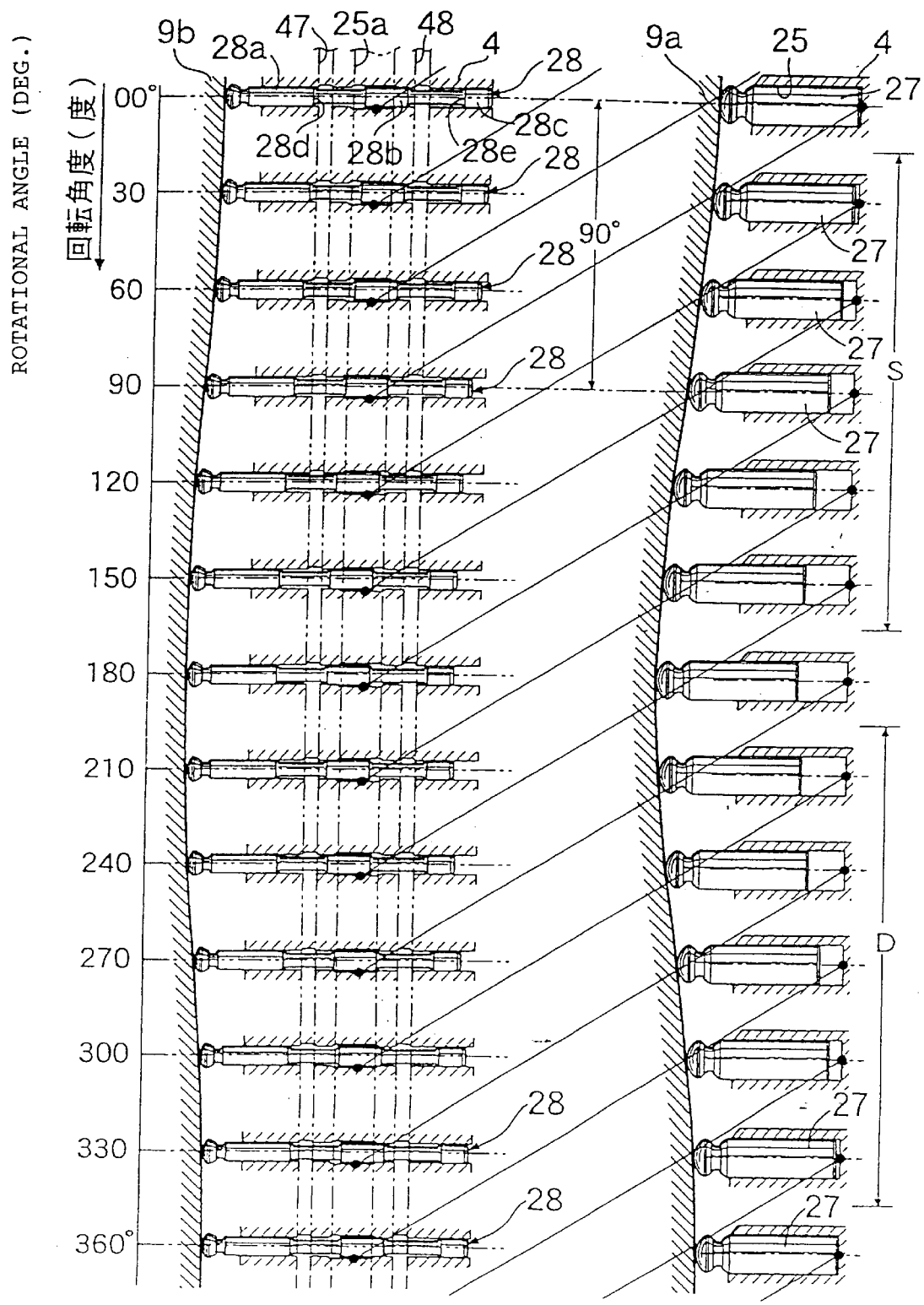
FIG. 9 is an operation timing diagram of a pump plunger and a first distributing valve.

As shown in FIG. 9, each first distributing valve 28 is provided successively from its spherical end 29$a$ side with a first land portion 28$a$, a first annular groove 28$d$, a second land portion 28$b$, a second annular groove 28$e$ and a third land portion 28$c$. When the first distributing valve 28 is at its rightmost limit of movement by the first valve swash plate 9$b$, the first annular groove 28$d$ provides communication between the associated pump port 25$a$ and the high-pressure oil path 47, and the second land portion 28$b$ cuts off communication between the pump port 25$a$ and the low-pressure oil path 48. On the other hand, at the leftmost limit of movement of the first distributing valve 28, the second annular groove 28$e$ provides communication between the associated pump port 25$a$ and the low-pressure oil path 48, and the second land portion 28$b$ cuts off communication between the pump port 25$a$ and the high-pressure oil path 47. Further, at the mid-point of its stroke, the first and second land portions 28$a$, 28$b$ isolate the pump port 25$a$ from both oil paths 47 and 48.

Figure 10:
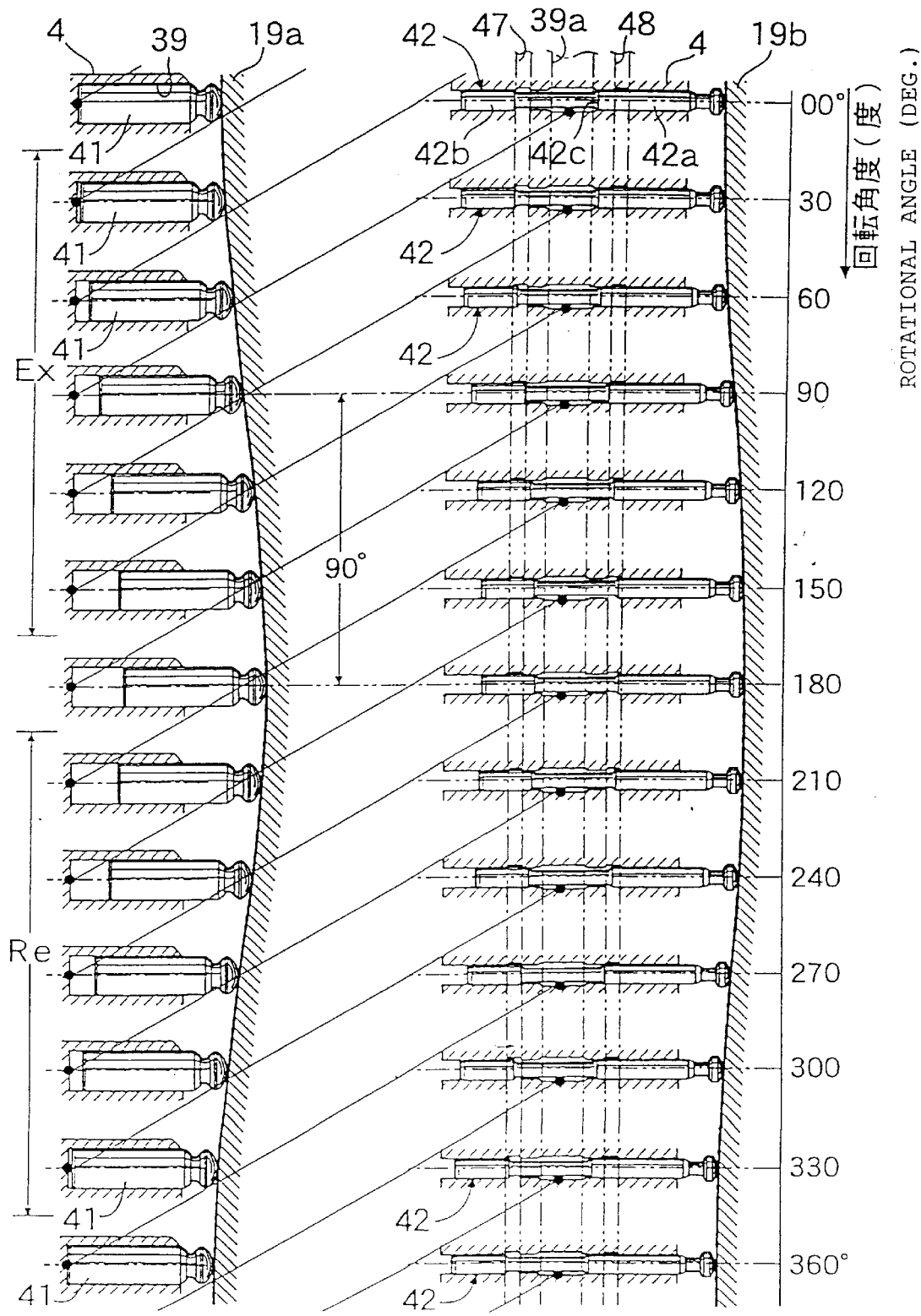
FIG. 10 is an operation timing diagram of a motor plunger and a second distributing valve.

On the other hand, as shown in FIG. 10, each second distributing valve 42 is provided successively from its spherical end 44$a$ side with a first land portion 42$a$, an annular groove 42$c$ and a second land portion 42$b$. At the leftmost limit of movement of the second distributing valve 42 by the second valve swash plate 19$b$, the annular groove 42$c$ provides communication between the associated motor port 39$a$ and the low-pressure oil path 48, and the second land portion 42$b$ cuts off communication between the motor port 39$a$ and the high-pressure oil path 47. On the other hand, at its rightmost limit of movement, the annular groove 42$c$ provides communication between the motor port 39$a$ and the high-pressure oil path 47, and the first land portion 42a cuts off communication between the motor port 39a and the low-pressure oil path 48. Further, at the mid-point of its stroke, the first and second land portions 42a, 42b isolate the motor port 39a from both paths 47 and 48.

As shown in FIG. 1, a replenishing oil path 50 is formed centrally of the output shaft 2, the oil path 50 being connected to a discharge side of a replenishing pump 49 which is driven by an engine (not shown). Further, a first communication hole 51 and a second communication hole 52 are formed in the output shaft 2 to provide communication between the replenishing oil path 50 and the low- and high-pressure oil paths 48, 47, and a first check valve 53 and a second check valve 54 are mounted in the first and second communication holes 51, 52, respectively. The first check valve 53 permits the flow of oil in only one direction from the replenishing oil path 50 to the low-pressure oil path 48, while the second check valve 54 permits the flow of oil in only one direction from the replenishing oil path 50 to the high-pressure oil path 47.

Figure 3A:
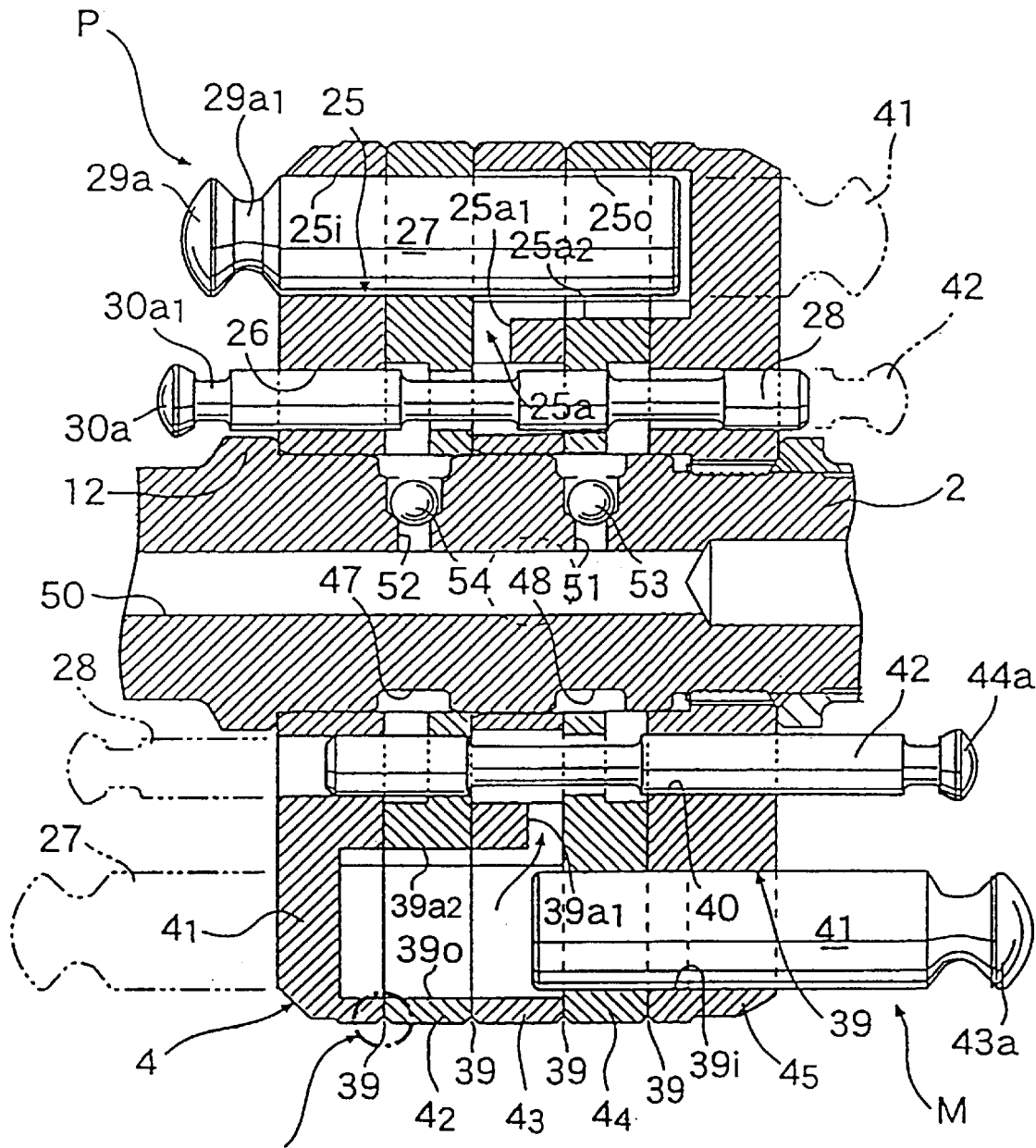
FIG. 3 is an enlarged view of principal portions in FIG. 1.
Figure 3B:
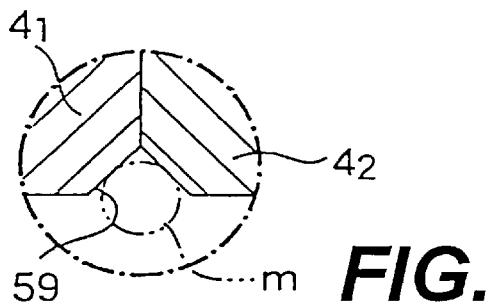
Figure 4:
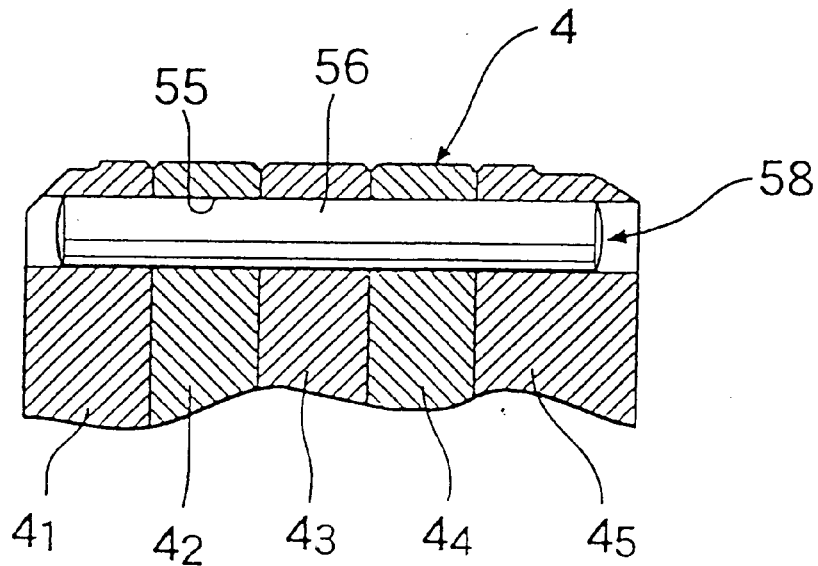
FIG. 4 is a sectional view taken along line 4—4 in FIG. 2.
Figure 8:
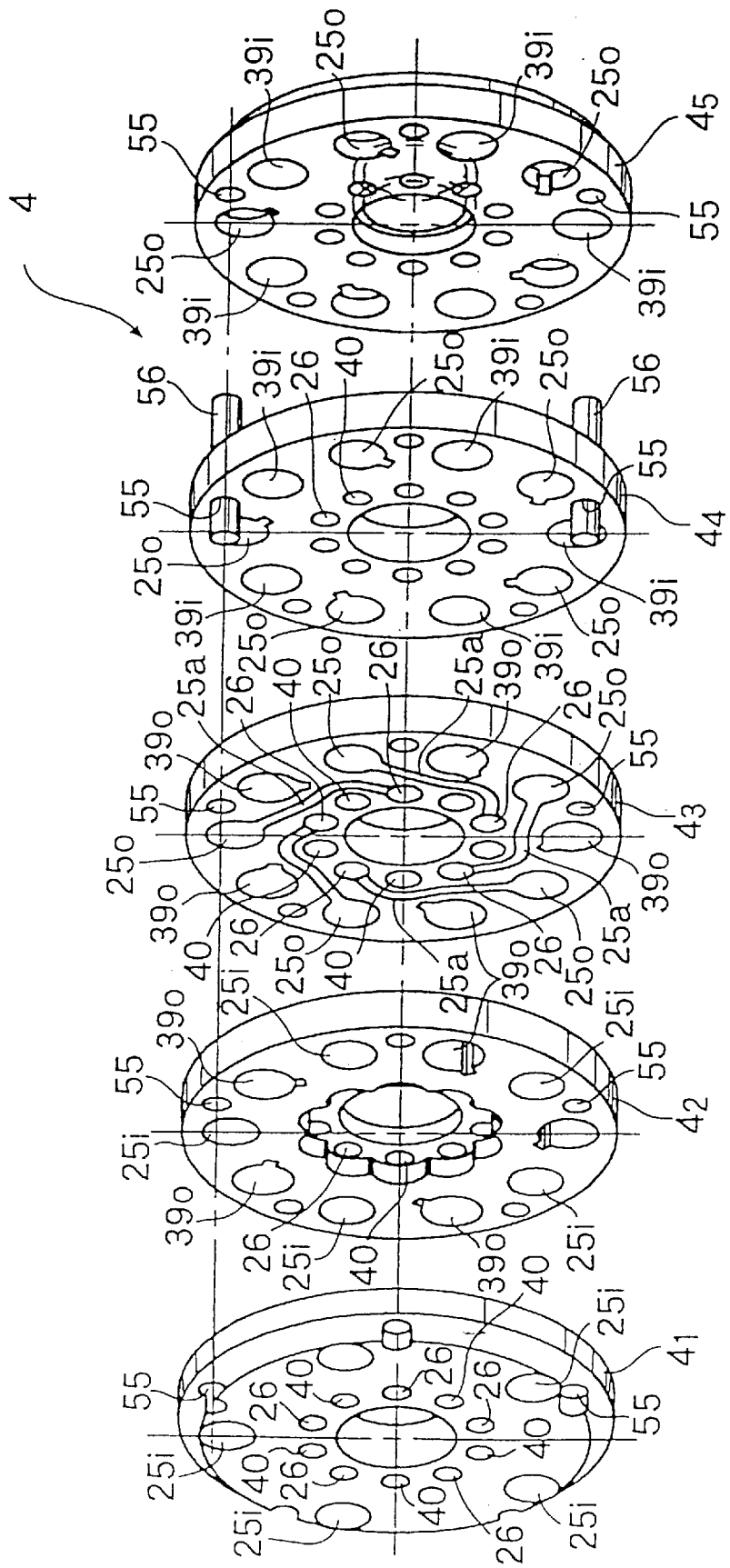
FIG. 8 is an exploded perspective view of a cylinder block.

As shown in FIGS. 3, 4 and 8, the cylinder block 4 is constituted by a plurality (five in the illustrated embodiment) of divided block plates $4_1$ to $4_5$ having divided surfaces orthogonal to the cylinder block axis X (same as the axis X of the output shaft 2), which block plates are combined together. The block plates 41 to $4_5$ are formed by press working and hence they have each a thickness suitable for press working. As to the structure for combining the block plates $4_1$ to $4_5$, it will be described later.

The five block plates will hereinafter be referred to as the first block plate $4_1$ to the fifth block plate 45 successively from the left-hand side in FIG. 3. The pump cylinder bores 25, motor cylinder bores 39, first valve holes 26 and second valve holes 40 are formed through the first block plate $4_1$ to the fifth block plate $4_5$. In this case, each pump cylinder bore 25, in order to support the associated pump plunger 27 slidably therein, comprises an inlet hole 25i formed through the first and second block plates $4_1$, $4_2$ and an inner hole 25o somewhat larger in diameter than the inlet hole 25i, the inner hole 25o being formed through the third block plate $4_3$ to the fifth block plate $4_5$ so as to define an oil chamber between the block plates and the inner end face and outer peripheral surface of the pump plunger 27. Likewise, each motor cylinder bore 39, in order to support the associated motor plunger 41 slidably therein, comprises an inlet hole 39i formed through the fourth and fifth block plates $4_4$, $4_5$ and an inner hole 39o somewhat larger in diameter than the inlet hole 39i, the inner hole 39o being formed through the first to third block plates $4_1$ to $4_3$ so as to define an oil chamber between the block plates and the inner end face and outer peripheral surface of the motor plunger 41.

Each pump port 25a comprises an axial groove 25 formed in the inner peripheral surface of the inner hole 25o in the associated pump cylinder bore 25 and a curved groove $25a_2$ formed in the divided surface of the third block plate $4_3$ located on the second block plate $4_2$ side, the curved groove $25a_2$ reaching the first valve hole 26 located at a 90° shifted position from the inner hole 25o, as noted previously. Likewise, each motor port 39a comprises an axial groove 39a, formed in the inner peripheral surface of the inner hole 39o of the associated motor cylinder bore 39 and a curved groove $39a_2$ formed in the divided surface of the third block plate $4_3$ located on the fourth block plate $4_4$ side, the curved groove $39a_2$ reaching the second valve hole 40 located at a 90° shifted position from the inner hole 39o, as noted above.

The high-pressure oil path 47 is formed between the fitting surfaces of the second block plate 42 and the output shaft 2, while the low-pressure oil path 48 is formed between the fitting surfaces of the fourth block plate 4. and the output shaft 2.

At least two (four in the illustrated embodiment) positioning holes 55 are formed through the first block plate $4_1$ to the fifth block plate 45 at intervals of 90° around the cylinder block axis X, and positioning pins 56 are inserted into the positioning holes 55, thereby bringing the pump cylinder bores 25, motor cylinder bores 39, first valve holes 26 and second valves holes 40 in the block plates $4_1$ to $4_5$ into alignment respectively on straight lines. The positioning holes 55 and the positioning pins 56 constitute positioning means 58.

The outer peripheral edges of the first to the fifth block plate $4_1$ to $4_5$ are chamfered so that when the first to the fifth block plate are superimposed together there are formed annular grooves 59 on their outer peripheries which grooves face the divided surfaces respectively.

In bonding together the first to the fifth block plate $4_1$ to $4_5$ thus superimposed one another under positioning with the positioning pins 56, linear solder members m are wound respectively round the annular grooves 59 and are then heat-melted while the first to the fifth block plate are brought into pressure contact with one another, resulting in that the thus-melted solder members get into not only between the divided surfaces of the block plates but also between the positioning pins 56 and the positioning holes 55 under a capillary action. Their subsequent solidification permits the block plates to be bonded together. In this way the block plates $4_1$ to $4_5$ are bonded not only to one another but also to the positioning pins 56, so that the positioning pins 56 fulfill the function of a connection member and hence a strong bonding force can be created. Moreover, since the first to the fifth block plate are brought into pressure contact with one another, the clearance between adjacent block plates becomes extremely fine and thus the permeation of the solder members to various portions under the capillary action can be improved.

Further, when the solder members m thus fed into the annular grooves 59 are melted, they are prevented by those annular grooves from flowing out to any other portion than the portions to be soldered, and thus the yield of the solder members m, which are expensive, is very high.

Figure 5:
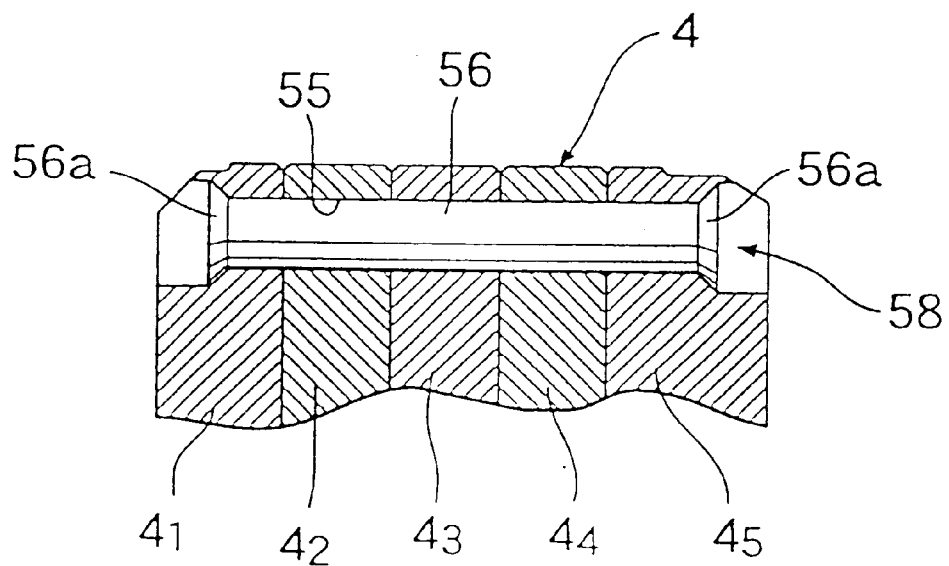
FIG. 5 is a sectional view showing a modification of FIG. 4.

As shown in FIG. 5, prior to the above soldering work, both ends 56a, 56a of each positioning pint 56 may be caulked so that the first to the fifth block plate $4_1$ to $4_5$ are pressed against one another and so that the pin 56 is prevented from coming off the associated positioning hole 55. This is effective in attaining a satisfactory soldered state without the use of any special jig for maintaining the laminated state of the block plates.

The operation of this embodiment will be described below.

If the first swash plate assembly 9 is rotated through the input gear 5a with the power of an engine (not shown) while holding the motor swash plate 19a at a certain angle of inclination, then, as noted previously, axial reciprocating motions can be imparted to the pump plungers 27 and the first distributing valves 28 forcibly and at good timing by cooperation of the pump swash plate 9a and the first valve swash plate 9b with the retainer plate 32. Thus, their proper reciprocating motions are ensured even in a high-speed operation.

As shown in FIG. 9, while the pump plungers 27 pass through a suction area S in which the oil chambers defined in the pump cylinder bores 25 are expanded, the first distributing valves 28 bring the pump ports 25a into communication with the low-pressure oil path 48, so that the hydraulic oil present in the oil path 48 is sucked into the oil chambers in the pump cylinder bores 25. On the other hand, while the pump plungers 27 pass through a discharge area D in which the oil chambers defined in the pump cylinder bores 25 are contracted, the first distributing valves 28 bring the pump ports 25a into communication with the high-pressure oil path 47, so that the hydraulic oil of high pressure present in the pump cylinder bores 25 is discharged to the oil path 47.

On the other hand, in the oil-hydraulic motor M, as shown in FIG. 10, while the motor plungers 41 are present in an expansion area Ex in which the oil chambers defined in the motor cylinder bores 39 are expanded, the second distributing valves 42 bring the motor ports 39a into communication with the high-pressure oil path 47, and while the motor plungers 41 are present in a contraction area Re in which the oil chambers defined in the motor cylinder bores 39 are contracted, the second distributing valves 42 bring the motor ports 39a into communication with the low-pressure oil path 48, so that the hydraulic oil of high pressure which has been discharged from the pump cylinder bores 25 to the high-pressure oil path 47 as mentioned above is fed to the cylinder bores 39 of the motor plungers 41 located in the expansion area Ex, thereby imparting thrust to the motor plungers 41. The motor plungers 41 located in the contraction area Re discharge the hydraulic oil from the motor cylinder bores 39 to the low-pressure oil path 48 as the contraction stroke proceeds. The motor plungers 41 thus thrusted by the hydraulic oil of high pressure present in the motor cylinder bores 39 push the motor swash plate 19a and impart a rotational torque thereto, then with the resulting reaction torque, the cylinder block 4 rotates in the same direction as the input gear 5a and this rotational torque is transmitted to an external load from the output shaft 2. Also in this case, reciprocating motions of the motor plungers 41 and the second distributing valves 42 are performed forcibly and at good timing by cooperation of the motor swash plate 19a and the second valve swash plate 19b with the retainer plate 45.

In such a normal operation, if the pressure of the low-pressure oil path 48 is reduced due to the leakage of oil pressure from various portions of the cylinder block 4, the first check valve 53 opens and the hydraulic oil is replenished to the low-pressure oil path 48 from the replenishing oil path 50. When engine brake is applied, the pressure of the high-pressure oil path 47 becomes low and that of the low-pressure oil path 48 becomes high, therefore, the replenishment for the leakage of oil pressure at this time is performed through the second check valve 54.

The oil-hydraulic pump P is a fixed displacement type with the inclination angle of the pump swash plate 9a being fixed, whereas the oil-hydraulic motor M is a variable displacement type with the inclination angle of the motor swash plate 19a being variable, so that the speed change ratio between the input member 5 and the output shaft 2 can be changed by changing the inclination angle of the motor swash plate 19a to increase or decrease the capacity of the oil-hydraulic motor M. More specifically, by changing the position of the motor swash plate 19a from its maximum tilted position (most tilted from the plane perpendicular to the cylinder block axis X) at which the capacity of the oil-hydraulic motor M is maximized, to its upright position (the position perpendicular to the cylinder block axis X) at which the said motor capacity made zero, it is possible to control the speed change ratio from a low ratio up to the top ratio of 1.

Figure 11:
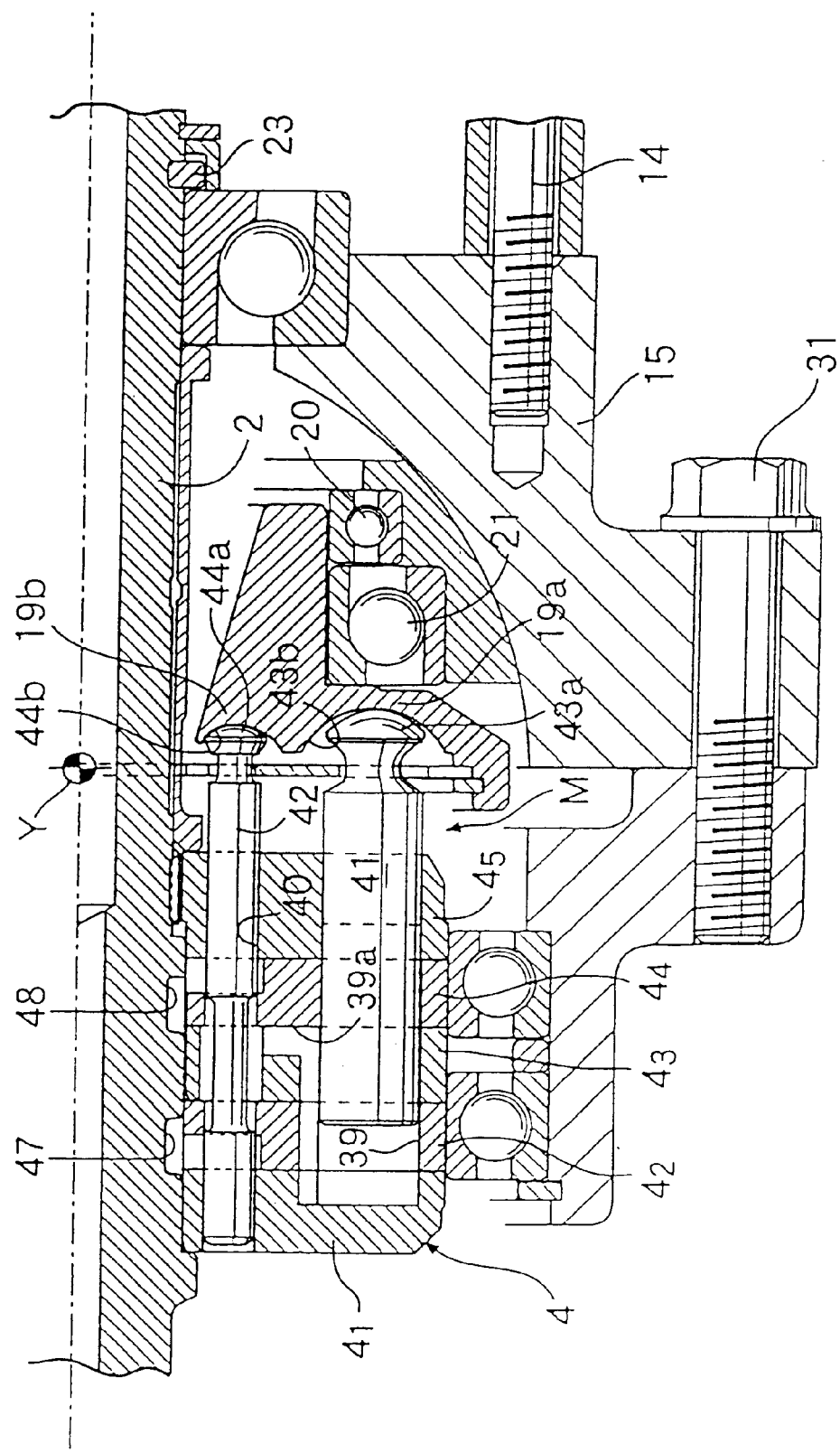
FIG. 11 is an operation explaining diagram in an upright state of a motor swash plate.

Besides, since the motor swash plate 19a, together with the second valve swash plate 19b disposed on the same slant plane as the motor swash plate, constitute the second swash plate assembly 19, the second valve swash plate 19b displaces itself together with the motor swash plate 19a. It follows that when the motor swash plate 19a reaches its upright position, the second valve swash plate 19b also stands upright. In the upright state of the second valve swash plate 19b, as shown in FIG. 11, the second distributing valves 42 are held at their stroke midpoints points to keep the motor ports 39a cut off from both high- and low-pressure oil paths 47, 48, thus resulting in the so-called lock-up state in which the oil path for communication between the oil-hydraulic pump P and the oil-hydraulic motor M is cut off.

Consequently, the volume of the oil path communicating with the oil-hydraulic pump P is reduced to half and the incompressibility of the hydraulic oil present in the said oil path is improved (this is due to the decrease of the oil path volume and consequent reduction by half of the total quantity of air bubbles contained in the hydraulic oil). Besides, since the leakage of oil in the oil-hydraulic motor M no longer exerts any influence on the; hydraulic transfer efficiency, whereby the relative rotation between the input member 5 and the output shaft 2 can be kept to a minimum and hence it is possible to enhance the hydraulic transfer efficiency in the state of top ratio. Additionally, since it is the second distributing valve 19b integral with the motor swash plate 19a that actuates the second distributing valves 42 in the above manner, it is not necessary to use a dedicated interlocking mechanism for operating the second valve swash plate 19b, thus contributing to the simplification of structure.

In the continuously variable transmission T of the above construction, the annular high-pressure oil path 47 and low-pressure oil path 48 are formed side by side in the axial direction of the cylinder block 4, and a large number of the first and second distributing valves 28, 42 are slidably fitted respectively in a large number of the first and second valve holes 26, 40 which are formed in the cylinder block 4 so as to extend in parallel with the cylinder block axis X while intersecting both oil paths 47 and 48. Consequently, all of the pump cylinder bores, motor cylinder bores and first and second valve holes 26, 40 are parallel to the cylinder block axis X and hence can be machined in the cylinder block 4 easily and quickly with a parallel multi-spindle tool. Besides, since the first and second valve swash plates 9b, 19b, which actuate the first and second distributing valves 28, 42, respectively, with their relative rotation with respect to the cylinder block 4, are disposed on both end sides of the cylinder block, like the pump and motor swash plates 9a, 19a, the number of components disposed on the outer periphery of the cylinder block 4 becomes smaller, thus greatly contributing to the reduction in radial size of the continuous variable transmission.

In the cylinder block 4, moreover, since the pump plungers 27 and the motor plungers 41 are arranged on the first pitch circle C1 and the first and second distributing valves 28, 42 smaller in diameter than the plungers 27 and 41 are arranged on the second pitch circle C2 of a smaller diameter than the first pitch circle C1, the distributing valves 28, and 42 are disposed in the dead space formed radially inside the plungers 27 and 41, so that even if the-first pitch circle C1 is set at a sufficiently large size to ensure sufficient reciprocating strokes to be given to the plungers 17 and 41 by the swash plates 9a and 19a, the presence of the distributing valves 28 and 42 does not lead to an increase in size of the, cylinder block 4, thus permitting the reduction in radial size of the continuously variable transmission T. Besides, since the distributing valves 28 and 42 are formed smaller in diameter than the plungers 27 and 41, the distributing valves can be easily disposed even inside the plungers 27 and 41.

Further, since the pump plungers 27 and the motor plungers 41 are arranged alternately on the same first pitch circle C1, it is possible to decrease the axial size of the cylinder block 4 without increase its entire size, whereby the continuously variable transmission T can be reduced its size in both radial and axial directions.

Further, since the high-pressure oil path 47 and the low-pressure oil path 48 are disposed inside the group of both pump plungers 27 and motor plungers 41, it is possible to minimize the lengths of both high- and low-pressure oil paths 47, 48, whereby the absolute quantity of air bubbles present in the hydraulic oil in those oil paths can be decreased and the hydraulic transfer efficiency can thereby be improved.

Further, since the pump swash plate 9a and the first valve swash plate 9b, which are disposed on the same slant plane, are formed integrally with the first swash plate assembly 9 and the motor swash plate 19a and the second valve swash plate 19b, which are disposed on the same slant plane, are formed integrally with the second swash plate assembly 19, it is possible to prevent an increase in axial size of the continuously variable transmission T caused by the presence of plural swash plates. Besides, the pump swash plate 9a and the first swash plate 9b can be machined at a time to the first swash plate assembly 9 and so can be done the motor swash plate 19a and the second valve swash plate 9b to the second swash plate assembly 19, thus ensuring a high mass-productivity.

The distributing valves 28 and 42, at the mid-points of their reciprocating strokes, cause the ports 25a and 39a to be cut off from both low- and high-pressure oil paths 47 and 48. In this connection, the pump ports 25a of the pump cylinder bores 25 are connected to the first valve holes 26 which are 90° out of phase in the direction opposite to the rotational direction of the cylinder block 4, and the motor ports 39a of the motor cylinder bores 39 are connected to the second valve holes 40 which are 90° out of phase in the direction opposite to the rotational direction of the cylinder block. Therefore, even if the pump swash plate 9a and the first valve swash plate 9b, as well as the motor swash plate 19a and the second valve swash plate 19b, are in the same inclined arrangement, when the plungers 27 and 41 reach their advance or retreat motion limit, the corresponding ports 25a and 39a come to be shut off from both low- and high-pressure oil paths 48, 47. Therefore, when the plungers 27 and 41 subsequently change their motion to retreat or advance motion, it is possible to switch over the ports 25a and 39a accurately into communication with the low-pressure oil path 43 or the high-pressure oil path 47.

Further, the cylinder block 4 is constituted by soldering together the first to fifth block plates $4_1$ to $4_5$ which have been formed by pressing as divided block plates having respective divided surfaces orthogonal to the- axis of the cylinder block. In this case, the inlet hole 25i corresponding to an inlet-side half of each pump cylinder bore 25 is formed in the first and second block plates $4_1$, $4_2$, and the inner hole 25o corresponding to an inner-side half of the pump cylinder bore and larger in diameter than the inlet hole 25i is formed in the third to fifth block plates $4_3$ to $4_5$. Likewise, the inlet hole 39i corresponding to an inlet-side half of each motor cylinder bore 39 is formed in the fourth and fifth block plates $4_4$, $4_5$ and the inner hole 39o corresponding to an inner-side half of the motor cylinder bore and larger in diameter than the inlet hole 39i is formed in the first to third block plates $4_1$ to $4_3$. Thus, the large number of inlet holes 25i, 39i or inner holes 25o, 39o formed in the block plates $4_1$ to $4_5$ are relatively shallow and mass production by press working of the block plates having such many holes can be done easily. Therefore, by bonding the block plates $4_1$ to $4_5$ with one another while positioning them with the positioning means 58, the cylinder block 4 can be manufactured efficiently.

Besides, even if there is a slight error in machining or assembly, such an error can be absorbed by the difference in diameter between the inlet holes 25i, 39i and the inner holes 25o, 39o of a larger diameter, so there is no obstacle to the sliding motion of the plungers 27, 41 and a further improvement of mass productivity can be attained by roughening the machining accuracy of the inner holes 25o, 39o.

In each of the inner holes 25o, 39o, moreover, since there is formed an oil chamber to which not only the inner end face but also the outer peripheral surface of the associated plunger 27 (41) face, the sliding surface of the plunger 27 (41) is always lubricated satisfactorily by the hydraulic oil present in the said oil chamber, whereby a smooth operation of the plunger can be ensured.

The curved grooves $25a_2$, $39a_2$ of the pump ports 25a and the motor ports 39a are relatively complicated in shape, but since those curved grooves are formed in the divided surface of the third block plate $4_3$, they can be formed simultaneously with the press working for the third block plate.

The present invention is not limited to the above embodiment, but various design modifications may be made within the scope not departing from the gist of the invention.

In the swash plate type continuously variable transmission according to the present invention, as set forth above, a large number of second distributing valves for bringing motor ports of motor cylinder bores into communication with high-and low-pressure oil paths selectively in an alternate manner are disposed in the cylinder block in parallel with the cylinder block axis; a valve swash plate adapted to rotate relatively with respect to the cylinder block to reciprocate the second distributing valves is integrally combined with a motor swash plate on the same slant plane, the motor ports of the motor cylinder bores are formed so as to be selectively controlled respectively by the second distributing valves at respective positions 90° out of phase in the circumferential direction of the cylinder block with respect to the motor cylinder bores; and when the valve swash plate, together with the motor swash plate, assumes an upright position, the second distributing valves are stopped at their stroke mid-points. Therefore, when the motor swash plate is in its upright position, the valve swash plate can be made upright at the same time without using any special interlocking mechanism and it is possible to obtain the lock-up state automatically in which the second distributing valves are held at their stroke midpoints. Thus, it is possible to simplify the structure of the swash plate type continuously variable transmission having the lock-up function.

As shown in FIGS. 1, 4 and 8, the cylinder block 4 is divided into five block plates through the respective divided surfaces orthogonal to the axis X of the cylinder block 4. The thus-divided block plates will hereinafter be referred to as the first block plate $4_1$ to the fifth block plate $4_5$. The pump cylinder bores 25, motor cylinder bores 39, first valve holes 26 and second valve holes 40 are formed through the first block plate $4_1$ to the fifth block plate $4_5$. The pump ports 25a are formed through the third block plate $4_3$ to the fifth block plate $4_5$, and the motor ports 39a are formed through the first block plate $4_1$ to the third block plate $4_3$. The high-pressure oil path 47 is formed between the fitting surfaces of the second block plate $4_2$ and the output shaft 2, while the low-pressure oil path 48 is formed between the fourth block plate $4_4$ and the output shaft 2.

At least two positioning holes 55 are formed through the first block plate $4_1$ to the fifth block plate $4_5$, and positioning pins 56 are fitted in the positioning holes 55. In this state, the divided surfaces of the first block plate $4_1$ to the fifth block plate $4_5$ are soldered together. At this time, the positioning pins 56 are also soldered to the inner peripheral surfaces of the positioning holes 55.

As shown in FIG. 4, prior to the above soldering work, both ends 56a, 56a of the positioning pins 56 may be caulked to prevent the pins 56 from coming off the positioning holes 55. This is convenient for the soldering work which follows.

In this case, since the cylinder block 4 is divided into plural block plates $4_1$ to $4_4$ and the high- and low-pressure oil paths 47 and 48, pump ports 25a and motor ports 39a are formed in the divided block plates in a predetermined manner, even the block plates having such complicated oil paths can be fabricated easily and precisely by pressing or casting, thus making it possible to enhance the effect of mass production.

Figure 12:
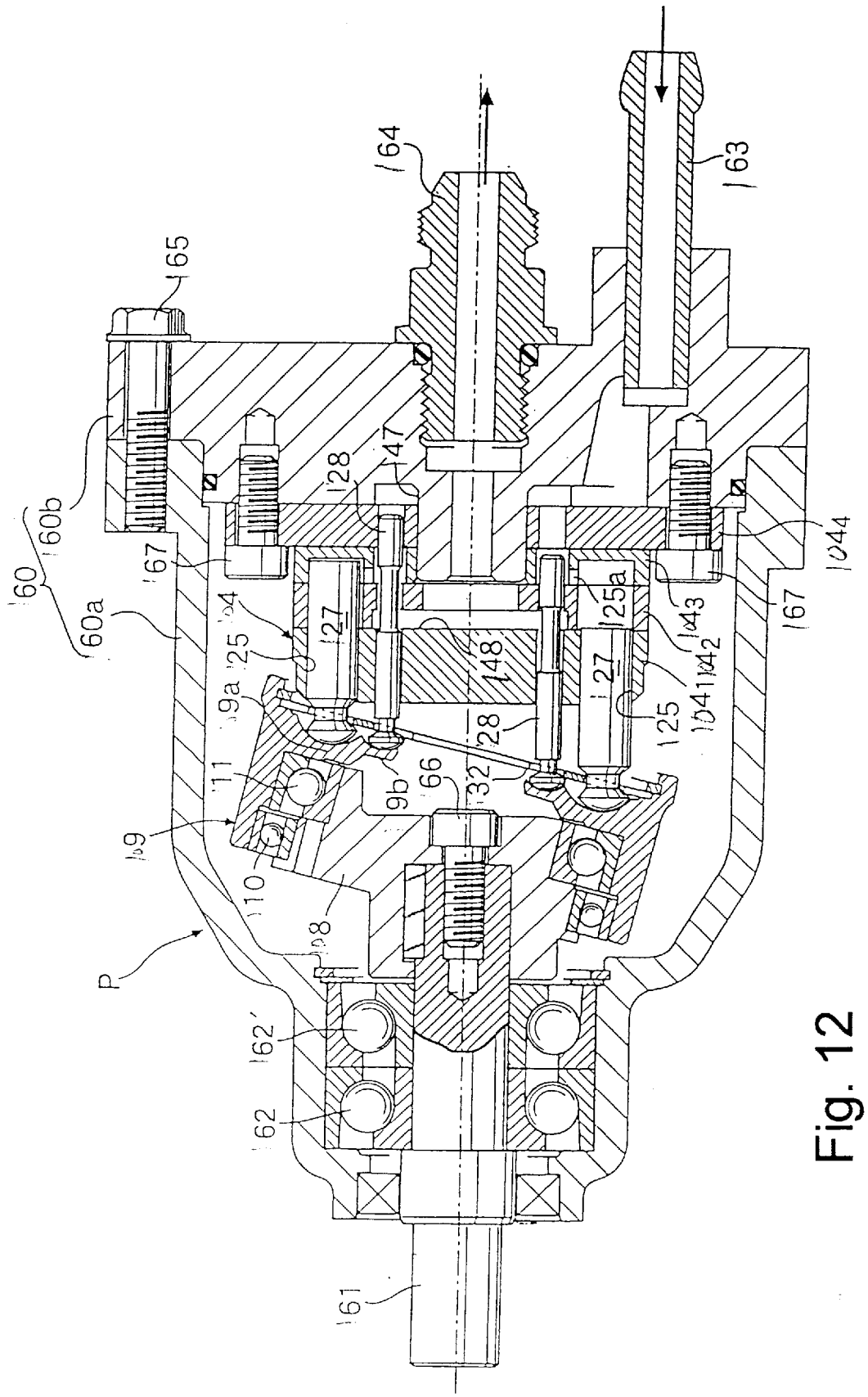
FIG. 12 is a sectional view in the longitudinal section of an oil-hydraulic pump according to the second embodiment of the present invention.

FIG. 12 illustrates the second embodiment of the present invention in which the invention is applied to only the swash plate type oil-hydraulic pump P. A pump case 160, which is supported by a suitable fixed structure, comprises a cup-like case body 160a and a cover 160b which is secured to an open end of the case body with bolt 165. An input shaft 161, which is driven by an engine (not shown), is supported in an end wall of the case body 160a through a pair of angular contact bearings 162, 162'. A suction pipe 163 and a discharge pipe 164 are attached to the cover 160b. The suction pipe 163 is connected to an oil sump or a low-pressure oil path (not shown), while the discharge pipe 164 is connected to an oil-hydraulic device (not shown) serving as a load.

Within the pump case 160, a swash plate holder 108 is fixed to the input shaft 161 with bolt 166, and on the outer periphery of the swash plate holder 108 is supported a swash plate assembly 109 rotatably through a ball bearing 110 and an angular contact bearing 111. As is the case with the first swash plate assembly 109 used in the previous embodiment, the swash plate assembly 109 used in this second embodiment is also integrally provided with a pump swash plate 109a and a valve swash plate 109b. A cylinder block 104 is fixed to the cover 160b with bolts 167 so as to be coaxial with the input shaft 160.

In the cylinder block 104, like the layout of the oil-hydraulic pump P used in the previous embodiment, a large odd-number (five in the illustrated embodiment being considered) of pump cylinder bores 125 and valve holes 126, pump ports 125a connected to the pump cylinder bores 125, and an annular low-pressure oil path 148, are formed and pump plungers 127 and distributing valves 128 are fitted in the pump cylinder bores 25 and valve holes 126, respectively. An annular high-pressure oil path 147 is formed between the joint surfaces of the cylinder block 104 and the cover 160b. The low-pressure oil path 148 and the high-pressure oil path 147 are in communication with the suction pipe 163 and the discharge pipe 164, respectively.

Spherical ends 129a and 130a of the pump plungers 127 and distributing valves 128 are kept engaged with spherical recesses 129b and 130b of the pump swash plate 109a and the valve swash plate 109b, respectively.

The cylinder block 104 is divided axially into four block plates $104_1$ to $104_4$. The pump cylinder bores 125 are formed through the first to the third block plate $104_1$ to $104_3$ successively from the left-hand side. In this case, the first block plate $104_1$ is thicker than the other block plates and the pump cylinder bores 125 formed therein are finished with a high precision. On the other hand, the pump cylinder bores 125 formed in the second and third block plates $104_2$, $104_3$ are formed a little larger and more roughly than the first block plate $104_1$. The low-pressure oil path 148 is formed in the second block plate $104_2$ and the pump ports 125a are formed in the third block plate $104_3$. The fourth block plate $104_4$ is larger in diameter than the other block plates and its outer peripheral portion is fixed to the cover 160b with bolts 167. According to this construction, it becomes possible to thin the first to fourth block plates $104_1$ to $104_4$ and press working can be done in high mass-productivity. The first to fourth block plates $104_1$ to $104_4$ are positioned and soldered with respect to one another in the same way as in the previous embodiment.

As set forth above, in a swash plate type hydraulic unit comprising a cylinder block, the cylinder block having a large number-of cylinder bores arranged annularly in parallel with a cylinder block axis on a first pitch circle which surrounds the said axis and also having a large number of ports connected individually to the cylinder bores, a large number of plungers slidably fitted respectively in the cylinder bores; plunger swash plates adapted to engage end portions of the plungers which end portions project to one end side of the cylinder block, the plunger swash plate being adapted to rotate relatively with respect to the cylinder block, thereby causing the plungers to reciprocate; a low-pressure oil path and a high-pressure oil path, a large number of spool type distributing valves disposed in the cylinder block annularly in parallel with the cylinder block axis on a second pitch circle which surrounds the said axis, the distributing valves being adapted to reciprocate axially to bring the ports of the cylinder bores into communication with the low-pressure oil path and the high-pressure oil path selectively in an alternate manner; and valve swash plates adapted to engage end portions of the distributing valves which end portions project to one end side of the cylinder block, the valve swash plates being adapted to rotate relatively with respect to the cylinder block, thereby causing the distributing valves to reciprocate, the present invention is firstly characterized in that the distributing valves are formed smaller in diameter than the plungers and that the second pitch circle is set smaller in diameter than the first pitch circle. Therefore, even if the first pitch -circle is set sufficiently large to ensure a sufficiently large stroke to be imparted to each plunger from the plunger swash plate, the presence of the distributing valve group does not increase the diameter of the cylinder block and it is possible to attain the reduction in radial size of the hydraulic unit. Besides, since the distributing valves are formed smaller in diameter than the plungers, the distributing valve group can be disposed easily even inside the plunger group. Moreover, according to the second feature of the present invention, since the valve swash plate is disposed on the same slant plane as the plunger swash plate and is formed integrally with the plunger swash plate, not only is it possible to suppress the increase in axial size of the hydraulic unit caused by the use of plural swash plates, but also both plunger swash plates and valve swash plates can be made integral with each other easily.

Further, according to the third feature of the present invention, the ports of the cylinder bores are formed so as to be controlled selectively by the distributing valves at respective positions 90° out of phase in the circumferential direction of the cylinder block with respect to the cylinder bores. Therefore, even if the plunger swash plates and the valve swash plates are disposed inclinedly in the same direction, the operation of the distributing valves can be controlled accurately at good timing and correspondingly to reciprocative positions of the plungers.

The present invention is not limited to the above embodiments, but various design modifications may be made within the scope not departing from the gist-of the invention. For example, in FIG. 6, instead of the cutouts 36 or 37 being opened to the peripheral edge of the retainer plate 32, they may be opened to insertion holes 57 formed in the retainer plate 32, the insertion holes 57 being larger in diameter than the spherical ends 19a or 30a.

According to the an additional feature of the present invention, as set forth above, in a swash plate type hydraulic unit, each plunger swash plate and the associated valve swash plate are disposed on the same slant plane and are formed integrally with each other to constitute a swash plate assembly, and a common retainer plate for keeping plungers and distributing valves engaged with the plunger swash plate and the valve swash plate is attached to the said swash plate assembly. Therefore, both plunger swash plate and valve swash plate can be formed at a time into the swash plate assembly, thus ensuring a high mass-productivity. Besides, plungers and distributing valves can be forced to follow the plunger swash plate and the valve swash plate by means of the retainer plate and hence it is possible to ensure proper reciprocating motions of the plungers and distributing valves even in a high-speed operation. Further, a simple structure is attained because both plungers and distributing valves are retained by a single common retainer plate.

According to another feature of the present invention, the fitted state between the neck portions of the plungers and distributing valves and the first and second retaining holes can be maintained by a simple operation; besides, it is not necessary to use a special stopper for preventing the neck portions from coming off the retaining holes. Thus, it is possible to further simplify the structure.

According to another feature of the present invention, each retainer plate can be attached to the associated swash plate assembly easily with use of such a simple component as cir-clip and thus the assembling performance is improved.

Further, according to a further feature of the present invention, even if each plunger swash plate and the associated valve swash plate are disposed inclinedly in the same direction, the operation of the distributing valves be controlled accurately at good timing and correspondingly to reciprocative positions of the plungers.

According to a feature of the present invention, as set forth above, in a swash plate type continuously variable transmission, an annular high-pressure oil path and an annular low-pressure oil path are formed side by side in an axial direction of a cylinder block; a large number of first distributing valves and second distributing valves are slidably fitted respectively in a large number of first valve holes and second valve holes, the first and second valve holes being formed in the cylinder block so as to extend in parallel with the axis of the cylinder block while intersecting both said oil paths; and a first valve swash plate and a second valve swash plate are disposed respectively adjacent a pump swash plate and a motor swash plate so as to rotate relatively with respect to the cylinder block, thereby causing the first and second distributing valves to reciprocate. Therefore, all of pump cylinder bores, motor cylinder bores, first and second valve holes, are located in parallel with the axis of the cylinder block and hence can be machined easily and quickly with a parallel multi-spindle tool, whereby the effect of mass production can be enhanced. By reciprocating motions of the first and second distributing valves parallel to the cylinder block axis, the supply and reception of oil pressure between the pump cylinder bores and the motor cylinder bores can be done without any trouble. Further, like pump swash plate and motor swash plate, the first and second valve swash plates for actuating the first and second distributing valves, respectively, are disposed on both end sides of the cylinder block, so that it is possible to greatly reduce radial size of the continuously variable transmission.

According to another feature of the present invention, since the annular high- and low-pressure oil paths are formed radially inside the pump cylinder bore group and the motor cylinder bore group, the overall length of both oil paths can be made as short as possible and it is possible to attain the reduction in volume of those oil paths, diminish the absolute quantity of air bubbles present in the hydraulic oil in the oil paths and thereby improve the hydraulic transfer efficiency.

According to a further feature of the present invention, pump plungers and motor plungers are arranged alternately on a first pitch circle which surrounds the cylinder block axis, and the first and second distributing valves, which are formed smaller in diameter than the pump plungers and the motor plungers, are arranged alternately on a second pitch circle smaller in diameter than and concentric with the first pitch circle. Consequently, the first and second distributing valve group is located in the dead space formed radially inside the pump and motor plunger group in the cylinder block, whereby it becomes possible to attain a further reduction in radial size of the continuously variable transmission while ensuring sufficient reciprocating strokes of the pump plungers and the motor plungers. Besides, since the first and second distributing valves are formed smaller in diameter than the pump plunger and the motor plungers, they can be disposed easily even inside those plunger group. Moreover, since the pump plungers and the motor plungers are arranged alternately in the circumferential direction of the cylinder block and so are the first and second distributing valves, it is possible to shorten the axial length of the cylinder block and attain the reduction in size even in the axial direction of the continuously variable transmission.

Further, according to a still further feature of the present invention, the first valve swash plate is disposed on the same slant plane as the pump swash plate and is formed integrally with the pump swash plate, while the second valve swash plate is disposed on the same slant plane as the motor swash plate and is formed integrally with the motor swash plate. Thus, not only is it possible to easily render the pump swash plate and the first valve swash plate integral with each other and the motor swash plate and the second valve swash plate also integral with each other, but also a further reduction in axial size of the continuously variable transmission can be attained.

Further, according to another feature of the present invention, the pump port of each pump cylinder bore is formed so as to be selectively controlled by the associated distributing valve at a position 90° out of phase in the circumferential direction of the cylinder block with respect to the pump cylinder bore, while the motor port of each motor cylinder bore is formed so as to be selectively controlled by the associated second distributing valve at a position 90° out of phase in the circumferential direction of the cylinder block with respect to the motor cylinder bore. Therefore, even with the pump swash plate and the first valve swash plate, as well as the motor swash plate and the second valve swash plate, being inclined in the same direction, the operations of the first and second distributing valves can be controlled accurately at good timing and correspondingly to reciprocating motions of the pump plungers and the motor plungers.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. In a swash plate type continuously variable transmission comprising:
   a cylinder block having a multitude of pump cylinder bores and motor cylinder bores arranged in parallel with and annularly around a cylinder block axis, a multitude of pump ports connected individually to said pump cylinder bores and a multitude of motor ports connected individually to said motor cylinder bores,
   a multitude of pump plungers slidably fitted respectively in the pump cylinder bores,
   a multitude of motor plungers slidably fitted respectively in the motor cylinder bores;
   a pump swash plate disposed oppositely to one end face of the cylinder block and adapted to rotate relatively with respect to said one end face of the cylinder block, thereby causing the pump plungers to reciprocate;
   a motor swash plate disposed oppositely to an opposite end face of the cylinder block, adapted to rotate relatively with respect to said opposite end face of the cylinder block, thereby causing the motor plungers to reciprocate, and capable of tilting between an upright position orthogonal to said axis in which the reciprocating stroke is reduced to zero and a maximum tilted position in which the reciprocating stroke is maximized; an annular high-pressure oil path and an annular low-pressure oil path both surrounding said axis; and a multitude of spool type first distributing valves and second distributing valves disposed in the cylinder block and adapted to bring the pump ports and the motor ports into communication with said high-pressure oil path and said low-pressure oil path selectively in an alternate manner through a stroke mid-point at which the pump ports and the motor ports are cut off from both said oil paths, the improvement characterized in that:
   said second distributing valves for bringing the motor ports into communication with the high-pressure oil path and the low-pressure oil path selectively in an alternate manner are disposed in the cylinder block in parallel with said axis;
   a valve swash plate adapted to rotate relatively with respect to the cylinder block to reciprocate the second distributing valves is integrally combined with the motor swash plate on the same slant plane;
   the motor ports of the motor cylinder bores are formed so as to be selectively controlled respectively by the second distributing valves at respective positions 90° out of phase in the circumferential direction of the cylinder block with respect to the motor cylinder bores; and
   when said valve swash plate, together with the motor swash plate, assumes an upright position, the second distributing valves are stopped at their stroke mid-points.

2. In a swash plate type hydraulic unit comprising:
   a cylinder block, said cylinder block having a multitude of cylinder bores arranged annularly in parallel with a cylinder block axis (X) on a first pitch circle which surrounds said axis (X) and also having a multitude of ports connected individually to said cylinder bores; a multitude of plungers slidably fitted respectively in the cylinder bores, plunger swash plates adapted to engage end portions of the plungers which end portions project to one end side of the cylinder block, said plunger swash plate being adapted to rotate relatively with respect to the cylinder block, thereby causing the plungers to reciprocate; a low-pressure oil path and a high-pressure oil path; a multitude of spool type distributing valves disposed in the cylinder block annularly in parallel with the cylinder block axis (X) on a second pitch circle which surrounds the axis (X), said distributing valves being adapted to reciprocate axially to bring the ports of the cylinder bores into communication with the low-pressure oil path and the high-pressure oil path selectively in an alternate manner; and valve swash plates adapted to engage end portions of the distributing valves which end portions project to one end side of the cylinder block, said valve swash plates being adapted to rotate relatively with respect to the cylinder block, thereby causing the distributing valves to reciprocate, the improvement characterized in that:
   said distributing valves are formed, smaller in diameter relative to the plungers; and
   said second pitch circle is set to be smaller in diameter relative to said first pitch circle.

3. The swash plate type hydraulic unit according to claim 2, wherein said valve swash plates are formed; and is set smaller in according to claim is disposed on the same slant plane as the plunger swash plate and is formed integrally with the plunger swash plate, and said valve swash plate is disposed on the same swash plane as the plunger swash plate and is formed integrally with the plunger swash plate.

4. The swash plate type hydraulic unit according to claim 2, wherein the ports of the cylinder bores are formed so as to be controlled selectively by the distributing valves at respective positions 90° out of phase in the circumferential direction of the cylinder block with respect to the cylinder bores.

5. In a swash plate type hydraulic unit comprising:
   a cylinder block, said cylinder block having a multitude of cylinder bores arranged annularly in parallel with a cylinder block axis (X) on a first pitch circle which surrounds said axis (X) and also having a multitude of ports connected individually to said cylinder bores;
   a multitude of plungers slidably fitted respectively in the cylinder bores; plunger swash plates adapted to rotate relatively with respect to the cylinder block, thereby causing the plungers to reciprocate, a low-pressure oil path and a high-pressure oil path; a multitude of spool type distributing valves disposed in the cylinder block annularly in parallel with the cylinder block axis (X) on a second pitch circle which is concentric with the first pitch circle, said distributing valves being adapted to reciprocate axially to bring the ports of the cylinder bores into communication with the low-pressure oil path and the high-pressure oil path selectively in an alternate manner; and valve swash plates adapted to rotate relatively with respect to the cylinder block, thereby causing the distributing valves to reciprocate, the improvement characterized in that:

said plunger swash plate and said valve swash plate are disposed on the same slant plane and are formed integrally with each other to constitute a swash plate assembly; and common retainer plates for retaining the plungers and the distributing valves in engagement with the plunger swash plates and the valve swash plates are attached to the swash plate assemblies respectively.

6. The swash plate type hydraulic unit according to claim 5, wherein said plungers and said distributing valves are formed with spherical ends through neck portions, said spherical ends being in engagement with the plunger swash plates and the valve swash plates, and said retainer plates have first and second retaining holes in which are respectively fitted the neck portions of the plungers and the distributing valves, the first and second retaining holes being smaller in diameter than the spherical ends, and also have first and second cutouts through which the retaining holes are opened to the peripheral edges of the retainer plates to permit the passage therethrough of the neck portions.

7. The swash plate type hydraulic unit according to claim 6, wherein at least one of the first and second cutouts, instead of being opened to the peripheral edges of the retainer plates, are opened to insertion holes formed in the retainer plates, said insertion holes being larger in diameter -than the corresponding spherical ends.

8. The swash plate type hydraulic unit according to claim 7, wherein the retainer plates are attached to cylindrical portions of the swash plate assemblies through cir-clips.

9. The swash plate type hydraulic unit according to claim 7, wherein the ports of the cylinder bores are formed so as to be controlled selectively by the distributing valves at respective positions 90° out of phase in the circumferential direction of the cylinder block with respect to the cylinder bores.

10. The swash plate type hydraulic unit according to claim 6, wherein the retainer plates are attached to cylindrical portions of the swash plate assemblies through cir-clips.

11. The swash plate type hydraulic unit according to claim 6, wherein the ports of the cylinder bores are formed so as to be controlled selectively by the distributing valves at respective positions 90° out of phase in the circumferential direction of the cylinder block with respect to the cylinder bores.

12. The swash plate type hydraulic unit according to claim 5, wherein the retainer plates are attached to cylindrical portions of the swash plate assemblies through cir-clips.

13. The swash plate type hydraulic unit according to claim 5, wherein the ports of the cylinder bores are formed so as to be controlled selectively by the distributing valves at respective positions 90° out of phase in the circumferential direction of the cylinder block with respect to the cylinder bores.

14. In a swash plate type continuously variable transmission comprising:

a cylinder block having a multitude of pump cylinder bores and motor cylinder bores arranged in parallel with and annularly around a cylinder block axis (X), a multitude of pump ports connected individually to said pump cylinder bores and a multitude of motor ports connected individually to said motor cylinder bores;

a multitude of pump plungers slidably fitted respectively in the pump cylinder bores;

a multitude of motor plungers slidably fitted respectively in the motor cylinder bores;

a pump swash plate disposed oppositely to one end face of the cylinder block and adapted to rotate relatively with respect to said one end face of the cylinder block, thereby causing the pump plungers to reciprocate;

a motor swash plate disposed oppositely to an opposite end face of the cylinder block and adapted to rotate relatively with respect to said opposite end face of the cylinder block, thereby causing the motor plungers to reciprocate;

an annular high-pressure oil path and an annular low-pressure oil path both surrounding said axis (X); and a multitude of spool type first distributing valves and second distributing valves disposed in the cylinder block and adapted to bring the pump ports and the motor ports into communication with said high-pressure oil path and said low-pressure oil path selectively in an alternate manner, the improvement characterized in that:

said annular high-pressure oil path and low-pressure oil path are formed side by side in the axial direction of the cylinder block;

said multitude of first distributing valves and second distributing valves are slidably fitted respectively in a multitude of first valve holes and second valve holes, said first and second valve holes being formed in the cylinder block so as to extend in parallel with said axis (X) while intersecting both said oil paths and a first valve swash plate and a second valve swash plate are disposed respectively adjacent the pump swash plate and the motor swash plate so as to rotate relatively with respect to the cylinder block, thereby causing the first and second distributing valves to reciprocate.

15. The swash plate type continuously variable transmission according to claim 14, wherein said annular high-pressure oil path and said annular low-pressure oil path are disposed radially inside the group of the pump cylinder-bores and the group of the motor cylinder bores.

16. The swash plate type continuously variable transmission according to claim 15, wherein said pump plungers and said motor plungers are arranged alternately on a first pitch circle which surrounds the cylinder block axis (X), and said first distributing valves and said second distributing valves, which are formed smaller in diameter than the pump plungers and the motor plungers, are arranged alternately on a second pitch circle smaller in diameter than and concentric with said first pitch circle.

17. The swash plate type continuously variable transmission according to claim 16, wherein said first valve swash plate is disposed on the same slant plane as said pump swash plate and is formed integrally with the pump swash plate, while said second valve swash plate is disposed on the same slant plane as said motor swash plate and is formed integrally with the motor swash plate.

18. The swash plate type continuously variable transmission according to claim 15, wherein said first valve swash plate is disposed on the same slant plane as said pump swash plate and is formed integrally with the pump swash plate, while said second valve swash plate is disposed on the same slant plane as said motor swash plate and is formed integrally with the motor swash plate.

19. The swash plate type continuously variable transmission according to claim 15, wherein the pump port of each said pump cylinder bore is formed so as to be selectively controlled by said first distributing valve at a position 90° out of phase in the circumferential direction of the cylinder block with respect to the pump cylinder bore, while the motor port of each said motor cylinder bore is formed so as to be selectively controlled by said second distributing valve at a position 90° out of phase in the circumferential direction of the cylinder block with respect to the motor cylinder bore.

20. The swash plate type continuously variable transmission according to claim 18, wherein said first valve swash plate is disposed on the same slant plane as said pump swash plate and is formed integrally with the pump swash plate, while said second valve swash plate is disposed on the same slant plane as said motor swash plate and is formed integrally with the motor swash plate.

\* \* \* \* \*